United States Patent
Chiu et al.

(10) Patent No.: US 10,524,162 B2
(45) Date of Patent: Dec. 31, 2019

(54) COMMUNICATION DEVICE AND METHOD THEREOF FOR D2D COMMUNICATIONS

(71) Applicant: Industrial Technology Research Institute, Hsinchu (TW)

(72) Inventors: Chun-Yuan Chiu, Pingtung County (TW); Ruo-Fei Ma, Tainan (TW); Nian Xia, Tainan (TW); Hsiao-Hwa Chen, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 74 days.

(21) Appl. No.: 15/997,626

(22) Filed: Jun. 4, 2018

(65) Prior Publication Data

US 2018/0288651 A1 Oct. 4, 2018

Related U.S. Application Data

(62) Division of application No. 15/084,852, filed on Mar. 30, 2016, now Pat. No. 10,021,596.

(51) Int. Cl.
*H04W 28/06* (2009.01)
*H04L 29/06* (2006.01)

(52) U.S. Cl.
CPC .......... *H04W 28/065* (2013.01); *H04L 69/22* (2013.01)

(58) Field of Classification Search
CPC .............. H04W 28/065; H04L 69/22
See application file for complete search history.

(56) References Cited

U.S. PATENT DOCUMENTS

| | | | |
|---|---|---|---|
| 5,903,618 | A | 5/1999 | Miyake et al. |
| 8,175,043 | B2 | 5/2012 | So |
| 8,213,356 | B2 | 7/2012 | Hart et al. |
| 8,885,520 | B2 | 11/2014 | Zahng et al. |
| 8,897,720 | B2 | 11/2014 | Rofougaran |

(Continued)

FOREIGN PATENT DOCUMENTS

| | | |
|---|---|---|
| CN | 102369784 B | 3/2014 |
| CN | 104159257 A | 11/2014 |

(Continued)

OTHER PUBLICATIONS

Taiwan Patent Office, Office Action, Patent Application Serial No. 105109995, dated Aug. 23, 2017, Taiwan.

(Continued)

*Primary Examiner* — Zhiren Qin

(57) ABSTRACT

A method for receiving a plurality of data packets is disclosed. The method includes: receiving MAC PDUs from a source UE of the wireless network through a relay UE, a base station and directly from the source UE, wherein the MAC PDUs are composed of RLC PDUs and RLC PDU segments; demultiplexing the MAC PDUs to retrieve the RLC PDUs and the RLC PDU segments based on a header field of each MAC PDU; reordering the RLC PDUs and the RLC PDU segments and performing a duplicate detection of the RLC PDUs and the RLC PDU segments according to TSNs, wherein each TSN is included in a header field of each RLC PDU and each RLC PDU segment; and reassembling the RLC PDUs and the RLC PDU segments into RLC SDUs using information included in the header field of each RLC PDU and each RLC PDU segment.

4 Claims, 23 Drawing Sheets

Relay Path

--> Control
→ Data

(56) References Cited

U.S. PATENT DOCUMENTS

| | | | |
|---|---|---|---|
| 9,736,751 | B2 | 8/2017 | Wang |
| 2004/0114593 | A1* | 6/2004 | Dick ............... H04L 1/1835 370/389 |
| 2008/0101411 | A1 | 5/2008 | Takahashi |
| 2009/0034507 | A1 | 2/2009 | Chang et al. |
| 2009/0086708 | A1 | 4/2009 | Pani |
| 2009/0190526 | A1* | 7/2009 | Pani ............... H04L 47/36 370/328 |
| 2009/0225711 | A1 | 9/2009 | Sammour |
| 2009/0310537 | A1* | 12/2009 | Bucknell .......... H04L 47/34 370/328 |
| 2010/0274921 | A1* | 10/2010 | Lerzer ............. H04W 80/02 709/234 |
| 2012/0044905 | A1 | 2/2012 | Kim |
| 2012/0057456 | A1 | 3/2012 | Bogatin et al. |
| 2012/0140704 | A1 | 6/2012 | Zhao |
| 2014/0112340 | A1 | 4/2014 | Shin et al. |
| 2014/0286234 | A1 | 9/2014 | Yu et al. |
| 2015/0029866 | A1 | 1/2015 | Liao et al. |
| 2015/0049694 | A1 | 2/2015 | Choi et al. |
| 2015/0181593 | A1 | 6/2015 | Kim |
| 2015/0223114 | A1 | 8/2015 | Tian et al. |
| 2016/0050611 | A1 | 2/2016 | Wang |
| 2016/0088645 | A1 | 3/2016 | Burhan et al. |
| 2016/0308776 | A1 | 10/2016 | Ozturk |
| 2017/0041766 | A1* | 2/2017 | Vajapeyam |
| 2018/0063300 | A1 | 3/2018 | Chiu |
| 2019/0274183 | A1* | 9/2019 | Pelletier ............. H04W 52/365 |

FOREIGN PATENT DOCUMENTS

| | | |
|---|---|---|
| CN | 104753627 A | 7/2015 |
| TW | 201338437 | 9/2013 |
| TW | 201429295 | 7/2014 |
| WO | WO 2010/102453 A1 | 9/2010 |
| WO | WO 2010/107357 A1 | 9/2010 |
| WO | WO 2010/139388 A1 | 12/2010 |

OTHER PUBLICATIONS

G. Yu et al., "Joint Mode Selection and Resource Allocation for Device-to-Device Communications," IEEE Transactions on Communications, Nov. 2014, pp. 3814-3824, vol. 62, Issue 11, IEEE, US.

L. Lei et al., "Queuing Models with Applications to Mode Selection in Device-to-Device Communications Underlaying Cellular Networks," IEEE Transactions on Wireless Communications, Dec. 2014, pp. 6697-6715, vol. 13, Issue 12, IEEE, US.

C. Gao et al., "Joint Mode Selection, Channel Allocation and Power Assignment for Green Device-to-Device Communication," 2014 IEEE International Conference on Communications, Jun. 2014, pp. 178-183, IEEE, US.

Y. Li et al., "Joing Optimization for Resource Allocation and Mode Selection in Device-to-Device Communication Underlaying Cellular Networks," 2014 IEEE International Conference on Communications, Jun. 2014, pp. 2245-2250, IEEE, US.

"Feasibility Study for Proximity Services (ProSe)," 3GPP TR 22.803, Technical Report, Jun. 2013, 45 pages, 3GPP Organizational Partners (ARIB, ATIS, CCSA, ETSI, TTA, TTC), France.

"Proximity-based Services (ProSe)," 3GPP TR 23.303, Technical Specification, Sep. 2015, 116 pages, 3GPP Organizational Partners (ARIB, ATIS, CCSA, ETSI, TTA, TTC), France.

"Evolved Universal Terrestrial Radio Access (E-UTRA) and Evolved Universal Terrestrial Radio Access Network (E-UTRAN); Overall description," 3GPP TS 36.300, Technical Specification, Sep. 2015, 254 pages, 3GPP Organizational Partners (ARIB, ATIS, CCSA, ETSI, TTA, TTC), France.

China Patent Office, Office Action, Patent Application Serial No. 201610659226.1, dated Apr. 30, 2019, China.

\* cited by examiner

| | 1 | 2 | 3 | 4 | 5 |
|---|---|---|---|---|---|
| High-power (1) | $\alpha_{1,1}^{(h)}$ | $\alpha_{1,2}^{(h)}$ | $\alpha_{1,3}^{(h)}$ | $\alpha_{1,4}^{(h)}$ | $\alpha_{1,5}^{(h)}$ |
| Mid-power (1) | $\alpha_{1,1}^{(m)}$ | $\alpha_{1,2}^{(m)}$ | $\alpha_{1,3}^{(m)}$ | $\alpha_{1,4}^{(m)}$ | $\alpha_{1,5}^{(m)}$ |
| Low-power (1) | $\alpha_{1,1}^{(l)}$ | $\alpha_{1,2}^{(l)}$ | $\alpha_{1,3}^{(l)}$ | $\alpha_{1,4}^{(l)}$ | $\alpha_{1,5}^{(l)}$ |
| High-power (2) | $\alpha_{2,1}^{(h)}$ | $\alpha_{2,2}^{(h)}$ | $\alpha_{2,3}^{(h)}$ | $\alpha_{2,4}^{(h)}$ | $\alpha_{2,5}^{(h)}$ |
| Mid-power (2) | $\alpha_{2,1}^{(m)}$ | $\alpha_{2,2}^{(m)}$ | $\alpha_{2,3}^{(m)}$ | $\alpha_{2,4}^{(m)}$ | $\alpha_{2,5}^{(m)}$ |
| Low-power (2) | $\alpha_{2,1}^{(l)}$ | $\alpha_{2,2}^{(l)}$ | $\alpha_{2,3}^{(l)}$ | $\alpha_{2,4}^{(l)}$ | $\alpha_{2,5}^{(l)}$ |

The index for the reuse candidate (columns); The index for the remaining D2D pair (rows, groups 1 and 2).

FIG. 22

COMMUNICATION DEVICE AND METHOD THEREOF FOR D2D COMMUNICATIONS

CROSS REFERENCE TO RELATED APPLICATIONS

This application is a Divisional of pending U.S. patent application Ser. No. 15/084,852, filed Mar. 30, 2016 and entitled "COMMUNICATION SYSTEM, COMMUNICATION DEVICE, BASE STATION AND METHOD THEREOF FOR D2D COMMUNICATIONS".

TECHNICAL FIELD

The present disclosure relates to a communication device, a method for transmitting a plurality of data packets and receiving a plurality of data packets, a method for allocating resources for D2D communications of a plurality of user equipments (UEs), and a communication system for D2D communications.

BACKGROUND

Today, smartphones and tablet PCs are used widely and high-capacity multimedia communications are activated, so mobile traffic is increasing rapidly. Mobile traffic is expected to continue to increase in the future, doubling in volume each year. Since most mobile traffic is transmitted through a base station, communication service providers are currently confronted with serious network overloads. In order to handle the increase in traffic, communication service providers are increasing the network equipment investment and commercializing the next generation of mobile communication standards (e.g., WiMAX, LTE (long term evolution), etc.) for efficiently handling a high volume of traffic in a hurry. Yet, in order to bear the expected increase in traffic even more rapidly, it is time to seek other solutions.

D2D (device-to-device) communication is a communication technology for directly delivering traffic between adjacent nodes. In a D2D communication environment, each node such as a mobile terminal and the like searches for another user equipment that is physically adjacent to the corresponding node, establishes a communication session, and then transmits traffic. Thus, since D2D communication can help solve the problem of traffic overload by distributing the traffic focused on a base station, D2D communication is spotlighted as an elementary technology of post-4G, next-generation mobile communication. Such standard organizations as 3GPP, IEEE and the like are promoting the enactment of a D2D communication standard based on LTE-A or Wi-Fi. Companies are developing an independent D2D communication technology.

SUMMARY

The following summary is illustrative only and is not intended to be limiting in any way. Exemplary implementations are described further in the detailed description below. Thus, the following summary is not intended to identify essential features of the claimed subject matter, nor is it intended for use in determining the scope of the claimed subject matter.

A communication device, a method for transmitting a plurality of data packets and reassembling a plurality of data packets, a method for allocating resources for D2D communications of a plurality of user equipments (UEs), and a communication system for D2D communications are provided.

In an exemplary embodiment, the disclosure is directed to a communication device for transmitting a plurality of data packets in a wireless network. The communication device at least includes a control circuit, a processor and a memory. The processor is installed in the control circuit. The memory is installed in the control circuit and coupled to the processor. The processor is configured to execute a program code stored in memory to: receive one or more first medium access control (MAC) protocol data units (PDUs) which include a plurality of radio link control (RLC) PDUs intended for a destination user equipment (UE) from a source UE of the wireless network; demultiplex the first MAC PDUs to retrieve the RLC PDUs based on a header field of each first MAC PDU; generate a plurality of RLC PDU segments from one or more of the RLC PDUs or a plurality of RRLC (Relay RLC) PDUs from all of the RLC PDUs according to one or more MAC PDU sizes, wherein the RRLC is a protocol layer between the MAC layer and the RLC layer; multiplex the RLC PDUs and the RLC PDU segments or the RRLC PDUs into one or more second MAC PDUs; and transmit the second MAC PDUs to the destination UE.

In some embodiments, the one of the RLC PDU segments is generated by re-segmenting a data field of one of the RLC PDUs and adding re-segmentation information to a header field of the one of the RLC PDUs according to one of the MAC PDU sizes. In some embodiments, the RRLC PDUs are generated by segmenting and concatenating the RLC PDUs and adding a header including segmentation and concatenation information to each RRLC PDU according to the MAC PDU sizes. In some embodiments, the MAC PDU sizes are obtained according to one or more resource grants transmitted from a base station. In some embodiments, the RLC PDUs and the RLC PDU segments or the RRLC PDUs are multiplexed into the second MAC PDUs according to a priority. In some embodiments, the priority is based on a first-in first-out (FIFO) principle or quality of service (QoS) parameters.

In an exemplary embodiment, the disclosure is directed to a method for transmitting a plurality of data packets in a wireless network. The method is used in a communication device. The method comprises: receiving one or more first medium access control (MAC) protocol data units (PDUs) which include a plurality of radio link control (RLC) PDUs intended for a destination user equipment (UE) from a source UE of the wireless network; demultiplexing the first MAC PDUs to retrieve the RLC PDUs based on a header field of each first MAC PDU; generating a plurality of RLC PDU segments from one or more of the RLC PDUs or a plurality of RRLC (Relay RLC) PDUs from all of the RLC PDUs according to one or more MAC PDU sizes, wherein the RRLC is a protocol layer between the MAC layer and the RLC layer; multiplexing the RLC PDUs and the RLC PDU segments or the RRLC PDUs into one or more second MAC PDUs; and transmitting the second MAC PDUs to the destination UE.

In some embodiments, the one of the RLC PDU segments is generated by re-segmenting a data field of one of the RLC PDUs and adding re-segmentation information to a header field of the one of the RLC PDUs according to one of the MAC PDU sizes. In some embodiments, the RRLC PDUs is generated by segmenting and concatenating the RLC PDUs and adding a header including segmentation and concatenation information to each RRLC PDU according to the MAC PDU sizes. In some embodiments, the MAC PDU sizes are obtained according to one or more resource grants transmitted from a base station. In some embodiments, the RLC PDUs and the RLC PDU segments or the RRLC PDUs are multiplexed into the second MAC PDUs according to a priority. In some embodiments, the priority is based on a first-in first-out (FIFO) principle or quality of service (QoS) parameters.

In an exemplary embodiment, the disclosure is directed to a communication device for receiving a plurality of data packets in a wireless network. The communication device at least comprises a control circuit, a processor and a memory. The processor is installed in the control circuit. The memory is installed in the control circuit and coupled to the processor. The processor is configured to execute a program code stored in memory to: receive one or more medium access control (MAC) protocol data units (PDUs) from a source user equipment (UE) of the wireless network through a relay UE, a base station and directly from the source UE, wherein the MAC PDUs are composed of a plurality of radio link control (RLC) PDUs and a plurality of RLC PDU segments; demultiplex the MAC PDUs to retrieve the RLC PDUs and the RLC PDU segments based on a header field of each MAC PDU; reorder the RLC PDUs and the RLC PDU segments and perform a duplicate detection of the RLC PDUs and the RLC PDU segments according to transmission sequence numbers (TSNs), wherein each TSN is included in a header field of each RLC PDU and each RLC PDU segment; and reassemble the RLC PDUs and the RLC PDU segments into a plurality of RLC service data units (SDUs) using information included in the header field of each RLC PDU and each RLC PDU segment.

In an exemplary embodiment, the disclosure is directed to a communication device for receiving a plurality of data packets in a wireless network. The communication device at least comprises a control circuit, a processor and a memory. The processor is installed in the control circuit. The memory is installed in the control circuit and coupled to the processor. The processor is configured to execute a program code stored in memory to: receive a plurality of first medium access control (MAC) protocol data units (PDUs) from a source user equipment (UE) of the wireless network through a relay UE and a base station, wherein the first MAC PDUs are composed of a plurality of RRLC (Relay RLC) PDUs which are protocol data units of a protocol layer between the MAC layer and the RLC layer, and receiving a plurality of second MAC PDUs from the source UE directly, wherein the second MAC PDUs are composed of a plurality of first RLC PDUs and a plurality of first RLC PDU segments; demultiplex the first MAC PDUs to retrieve the RRLC PDUs based on a header field of each first MAC PDU, and demultiplex the second MAC PDUs to retrieve the first RLC PDUs and the first RLC PDU segments based on a header field of each second MAC PDU; reorder the RRLC PDUs and perform a duplicate detection of the RRLC PDUs according to transmission sequence numbers (TSNs), wherein each TSN is included in a header field of each RRLC PDU; reassemble the RRLC PDUs into a plurality of second RLC PDUs and a plurality of second RLC PDU segments using information included in the header field of each RRLC PDU; reorder the first RLC PDUs, the first RLC PDU segments, the second RLC PDUs, and the second RLC PDU segments, and perform a duplicate detection of the first RLC PDUs, the first RLC PDU segments, the second RLC PDUs, and the second RLC PDU segments according to the TSNs, wherein each TSN is included in a header field of each RLC PDU and each RLC PDU segment; and reassemble the first RLC PDUs, the first RLC PDU segments, the second RLC PDUs, and the second RLC PDU segments into a plurality of RLC service data units (SDUs) using the information included in the header field of each RLC PDU and each RLC PDU segment.

In an exemplary embodiment, the disclosure is directed to a method for receiving a plurality of data packets in a wireless network. The method is used in a communication device. The method comprises: receiving one or more medium access control (MAC) protocol data units (PDUs) from a source user equipment (UE) of the wireless network through a relay UE, a base station and directly from the source UE, wherein the MAC PDUs are composed of a plurality of radio link control (RLC) PDUs and a plurality of RLC PDU segments; demultiplexing the MAC PDUs to retrieve the RLC PDUs and the RLC PDU segments based on a header field of each MAC PDU; reordering the RLC PDUs and the RLC PDU segments and performing a duplicate detection of the RLC PDUs and the RLC PDU segments according to transmission sequence numbers (TSNs), wherein each TSN is included in a header field of each RLC PDU and each RLC PDU segment; and reassembling the RLC PDUs and the RLC PDU segments into a plurality of RLC service data units (SDUs) using information included in the header field of each RLC PDU and each RLC PDU segment.

In an exemplary embodiment, the disclosure is directed to a method for receiving a plurality of data packets in a wireless network. The method is used in a communication device. The method comprises: receiving a plurality of first medium access control (MAC) protocol data units (PDUs) from a source user equipment (UE) of the wireless network through a relay UE and a base station, wherein the first MAC PDUs are composed of a plurality of RRLC (Relay RLC) PDUs which are protocol data units of a protocol layer between the MAC layer and the RLC layer, and receiving a plurality of second MAC PDUs from the source UE directly, wherein the second MAC PDUs are composed of a plurality of first RLC PDUs and a plurality of first RLC PDU segments; demultiplexing the first MAC PDUs to retrieve the RRLC PDUs based on a header field of each first MAC PDU, and demultiplexing the second MAC PDUs to retrieve the first RLC PDUs and the first RLC PDU segments based on a header field of each second MAC PDU; reordering the RRLC PDUs and performs a duplicate detection of the RRLC PDUs according to transmission sequence numbers (TSNs), wherein each TSN is included in a header field of each RRLC PDU; reassembling the RRLC PDUs into a plurality of second RLC PDUs and a plurality of second RLC PDU segments using information included in the header field of each RRLC PDU; reordering the first RLC PDUs, the first RLC PDU segments, the second RLC PDUs, and the second RLC PDU segments, and performing a duplicate detection of the first RLC PDUs, the first RLC PDU segments, the second RLC PDUs, and the second RLC PDU segments according to the TSNs, wherein each TSN is included in a header field of each RLC PDU and each RLC PDU segment; and reassembling the first RLC PDUs, the first RLC PDU segments, the second RLC PDUs, and the second RLC PDU segments into a plurality of RLC service data units (SDUs) using the information included in the header field of each RLC PDU and each RLC PDU segment.

A method for allocating resources for Device-to-Device (D2D) communications of a plurality of user equipments (UEs), used in a base station, the method comprising: receiving channel state information (CSI) reported by the UEs; estimating link qualities of all D2D communication pairs according to the CSI; determining a suitable D2D communication mode for each D2D communication pair according to the link qualities; and allocating physical resource blocks (PRBs) according to the link qualities.

In some embodiments, the method further comprises: determining whether there is at least one D2D communication pair which is not allocated any PRBs; and sharing the allocated PRBs with at least one D2D communication pair according to a data rate increment when determining there is at least one D2D communication pair which is not allocated any PRBs. In some embodiments, the suitable D2D communication mode is a connection set between a source UE and a destination UE, between the source UE and the destination UE through a relay UE, or between the source UE and the destination UE through the base station.

In an exemplary embodiment, the disclosure is directed to a communication system for D2D communications in a wireless network. The communication system at least comprises a source user equipment (UE), a destination UE, a relay UE and a base station. The base station receives channel state information (CSI) reported by the source UE, the destination UE, and the relay UE. The base station estimates link qualities of all D2D communication pairs according to the CSI, and determines a suitable D2D communication mode from the source UE to the destination UE according to the link qualities, and transmits a resource grant to the source UE to instruct the source UE to transmit data packets to the destination UE in the suitable D2D communication mode. The suitable D2D communication mode is a connection set between the source UE and the destination UE, between the source UE and the destination UE through the relay UE, or between the source UE and the destination UE through the base station.

In some embodiments, the suitable D2D communication mode is the connection set between the source UE and the destination UE through the relay UE, the relay UE further at least comprises: a control circuit, a processor and a memory. The processor is installed in the control circuit. The memory is installed in the control circuit and coupled to the processor. The processor is configured to execute a program code stored in memory to: receive one or more first medium access control (MAC) protocol data units (PDUs) which include a plurality of radio link control (RLC) PDUs intended for the destination UE from the source UE of the wireless network; demultiplex the first MAC PDUs to retrieve the RLC PDUs based on a header field of each first MAC PDU; generate a plurality of RLC PDU segments from one or more of the RLC PDUs or a plurality of RRLC (Relay RLC) PDUs from all of the RLC PDUs according to one or more MAC PDU sizes, wherein the RRLC is a protocol layer between the MAC layer and the RLC layer; multiplex the RLC PDUs and the RLC PDU segments or the RRLC PDUs into one or more second MAC PDUs according to a first-in first-out (FIFO) principle; and transmit the second MAC PDUs to the destination UE. In some embodiments, the destination UE further at least comprises: a control circuit, a processor and a memory. The processor installed in the control circuit. The memory installed in the control circuit and coupled to the processor. The processor is configured to execute a program code stored in memory to: receive one or more medium access control (MAC) protocol data units (PDUs) from the source UE through the relay UE, the base station and directly from the source UE, wherein the MAC PDUs are composed of a plurality of radio link control (RLC) PDUs and a plurality of RLC PDU segments; demultiplex the MAC PDUs to retrieve the RLC PDUs and the RLC PDU segments based on a header field of each MAC PDU; reorder the RLC PDUs and the RLC PDU segments and perform a duplicate detection of the RLC PDUs and the RLC PDU segments according to transmission sequence numbers (TSNs), wherein each TSN is included in a header field of each RLC PDU and each RLC PDU segment; and reassemble the RLC PDUs and the RLC PDU segments into a plurality of RLC service data units (SDUs) using information included in the header field of each RLC PDU and each RLC PDU segment. In some embodiments, the destination UE further at least comprises: a control circuit, a processor and a memory. The processor is installed in the control circuit. The memory is installed in the control circuit and coupled to the processor. The processor is configured to execute a program code stored in memory to: receive a plurality of first medium access control (MAC) protocol data units (PDUs) from the source UE through the relay UE and the base station, wherein the first MAC PDUs are composed of a plurality of RRLC (Relay RLC) PDUs which are protocol data units of a protocol layer between the MAC layer and the RLC layer, and receive a plurality of second MAC PDUs from the source UE directly, wherein the second MAC PDUs are composed of a plurality of first RLC PDUs and a plurality of first RLC PDU segments; demultiplex the first MAC PDUs to retrieve the RRLC PDUs based on a header field of each first MAC PDU, and demultiplex the second MAC PDUs to retrieve the first RLC PDUs and the first RLC PDU segments based on a header field of each second MAC PDU; reorder the RRLC PDUs and performs a duplicate detection of the RRLC PDUs according to transmission sequence numbers (TSNs), wherein each TSN is included in a header field of each RRLC PDU; reassemble the RRLC PDUs into a plurality of second RLC PDUs and a plurality of second RLC PDU segments using information included in the header field of each RRLC PDU; reorder the first RLC PDUs, the first RLC PDU segments, the second RLC PDUs, and the second RLC PDU segments, and perform a duplicate detection of the first RLC PDUs, the first RLC PDU segments, the second RLC PDUs, and the second RLC PDU segments according to the TSNs, wherein each TSN is included in a header field of each RLC PDU and each RLC PDU segment; and reassemble the first RLC PDUs, the first RLC PDU segments, the second RLC PDUs, and the second RLC PDU segments into a plurality of RLC service data units (SDUs) using the information included in the header field of each RLC PDU and each RLC PDU segment. In some embodiments, the suitable D2D communication mode is the connection set between the source UE and the destination UE through the base station, the base station at least comprises: a control circuit, a processor and a memory. The processor installed in the control circuit. The memory installed in the control circuit and coupled to the processor. The processor is configured to execute a program code stored in memory to: receive one or more first medium access control (MAC) protocol data units (PDUs) which include a plurality of radio link control (RLC) PDUs intended for the destination UE from the source UE of the wireless network; demultiplex the first MAC PDUs to retrieve the plurality of RLC PDUs based on a header field of each first MAC PDU; generate a plurality of RLC PDU segments from one or more of the RLC PDUs or a plurality of RRLC (Relay RLC) PDUs from all of the RLC PDUs according to one or more MAC PDU sizes, wherein the RRLC is a protocol layer between the MAC layer and the RLC layer; multiplex the RLC PDUs and the RLC PDU segments or the RRLC PDUs into one or more second MAC PDUs according to a first-in first-out (FIFO) principle or quality of service (QoS) parameters; and transmit the second MAC PDUs to the destination UE A detailed description is given in the following embodiments with reference to the accompanying drawings.

DRAWINGS

FIG. 22 shows an example illustrating the two-dimensional optimal reuse partner searching process performed by the eNB in the second-round resource allocation according to an embodiment of the present disclosure.

DETAILED DESCRIPTION

Figure 1C:
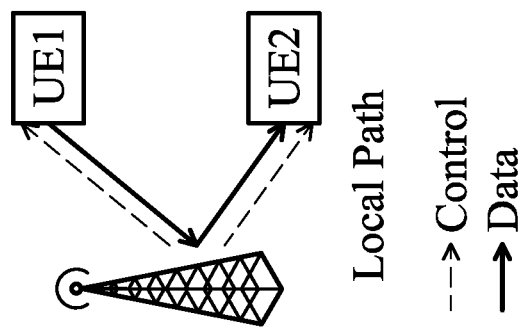
FIG. 1C shows an example illustrating a local route mode of D2D communication.

Exemplary embodiments of the present disclosure are described below in sufficient detail to enable those of ordinary skill in the art to embody and practice the present disclosure. It is important to understand that the present disclosure may be embodied in many alternate forms and should not be construed as being limited to the exemplary embodiments set forth herein.

Accordingly, while the disclosure can be modified in various ways and take on various alternative forms, specific embodiments thereof are shown in the drawings and described in detail below as examples. There is no intent to limit the disclosure to the particular forms disclosed. On the contrary, the disclosure is to cover all modifications, equivalents, and alternatives falling within the spirit and scope of the appended claims. Elements of the exemplary embodiments are consistently denoted by the same reference numerals throughout the drawings and detailed description.

It should be understood that, although the terms first, second, A, B, etc. may be used herein in reference to elements of the disclosure, such elements should not be construed as being limited by these terms. For example, a first element could be termed a second element, and a second element could be termed a first element, without departing from the scope of the present disclosure. Herein, the term "and/or" includes any and all combinations of one or more referents.

It should be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements. Other words used to describe relationships between elements should be interpreted in a like fashion (i.e., "between" versus "directly between," "adjacent" versus "directly adjacent," etc.).

The terminology used herein to describe embodiments of the disclosure is not intended to limit the scope of the disclosure. The articles "a," "an," and "the" are singular in that they have a single referent, however the use of the singular form in the present document should not preclude the presence of more than one referent. In other words, elements of the disclosure referred to in the singular may number one or more, unless the context clearly indicates otherwise. It should be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art to which this disclosure belongs. It should be further understood that terms in common usage should also be interpreted as is customary in the relevant art and not in an idealized or overly formal sense unless expressly so defined herein.

The 3rd Generation Partnership Project, also referred to as "3GPP," is a collaboration agreement that aims to define globally applicable technical specifications and technical reports for third and fourth generation wireless communication systems. The 3GPP may define specifications for next generation of mobile networks, systems, and devices.

3GPP Long Term Evolution (LTE) is the name given to a project to improve the Universal Mobile Telecommunication System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP Long Term Evolution (LTE), LTE-Advanced (LTE-A) and other standards (e.g., 3GPP Releases 8, 9, 10 and/or 11). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing communication systems and methods herein, a wireless communication device may alternatively be referred to as a mobile station, a User Equipment (UE), an access terminal, a subscriber station, a mobile terminal, a remote station, a user terminal, a terminal, a subscriber unit, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a User Equipment (UE). However, as the scope of the present disclosure should not be limited to the 3GPP standards, the terms "UE" and "wireless communication device" may be used interchangeably herein to mean the more general term "wireless communication device."

In 3GPP specifications, a base station is typically referred to as a Node B, an evolved or enhanced Node B (eNB), a home enhanced or evolved Node B (HeNB) or some other similar terminology. As the scope of the disclosure should not be limited to 3GPP standards, the terms "base station," "Node B," "eNB," and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote a wireless communication device and/or a base station.

Figure 1B:
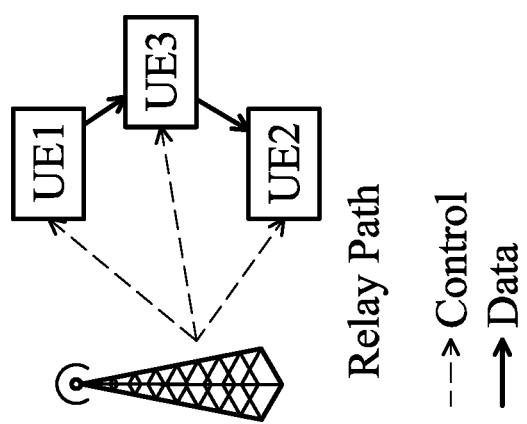
FIG. 1B shows an example illustrating a relay path mode of D2D communication.
Figure 1A:
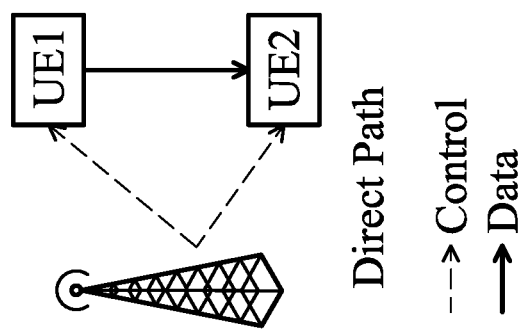
FIG. 1A shows an example illustrating a direct path mode of D2D communication with no intermediate nodes involved.

FIGS. 1A~1C are schematic diagrams of three different modes of D2D communication. FIG. 1A shows an example illustrating a direct path mode of D2D communication with no intermediate nodes involved. As shown in FIG. 1A, an eNB transmits control information to a source UE (e.g., UE1) and a destination UE (e.g., UE2). After the configuration of D2D communication is completed, the UE1 can directly send data packets to the UE2 through the direct path. FIG. 1B shows an example illustrating a relay path mode of D2D communication. As shown in FIG. 1B, the eNB can also transmit the control information to one or more relay UEs (e.g., UE3) besides the UE1 and the UE2. After the configuration of D2D communication is completed, the UE1 can transmit data packets to the UE2 by employing the UE3 through the relay path. FIG. 1C shows an example illustrating a local route mode of D2D communication. As shown in FIG. 1C, the eNB can transmit the control information to the UE1 and the UE2. After the configuration of D2D communication is completed, the UE1 can transmit the data packets to the eNB through uplink (UL). After receiving the data packets, the eNB can forward the data packets directly to the UE2 without transmitting the data packets to the core network (CN). The UE2 can receive the data packets from the eNB through downlink (DL).

Figure 2:
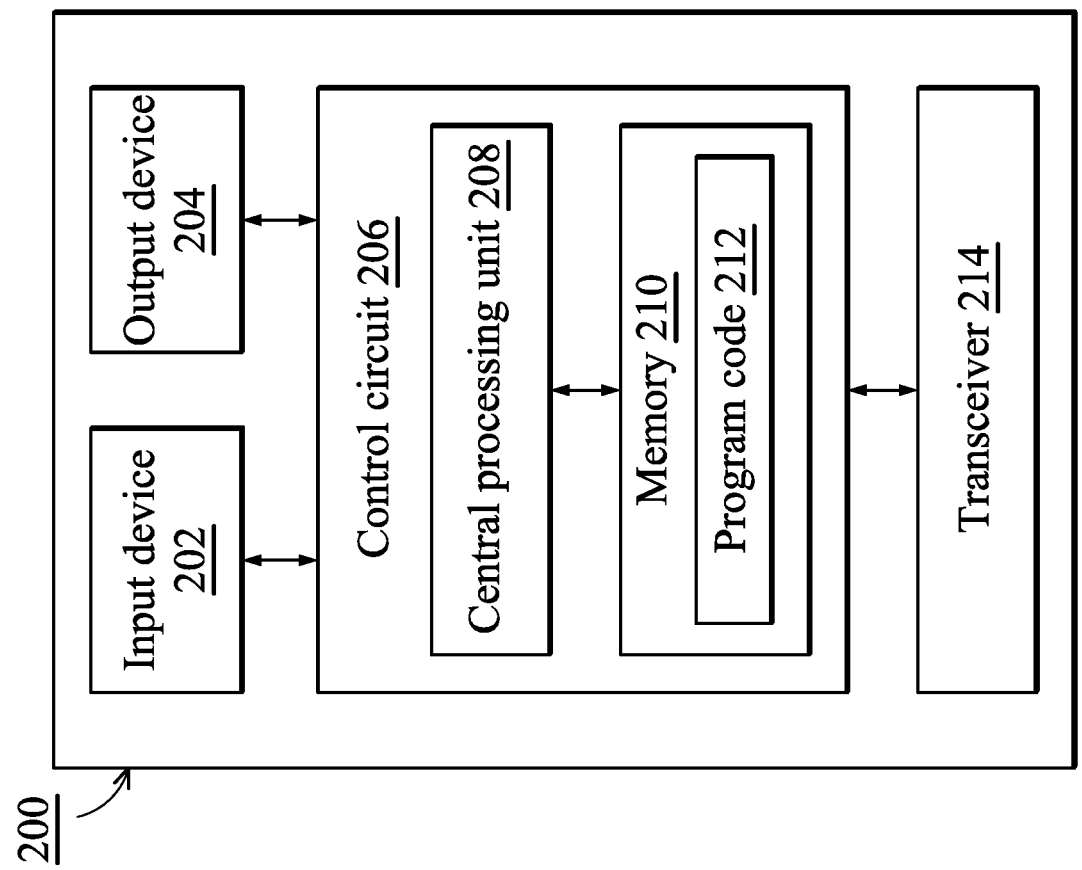
FIG. 2 shows an alternative simplified functional block diagram of a communication device according to one embodiment of the present disclosure.

Next, turning to FIG. 2, FIG. 2 shows an alternative simplified functional block diagram of a communication device 200 according to one embodiment of the present disclosure. As shown in FIG. 2, the communication device 200 in a wireless communication system can be utilized for realizing the eNB, the UE1, the UE2 and the UE3 in FIG. 1, and the communication device may be used in the LTE system, the LTE-A system or other system which is approximate to the two systems described above. The communication device 200 may include an input device 202, an output device 204, a control circuit 206, a central processing unit (CPU) 208, a memory 210, a program code 212, and a transceiver 214. The control circuit 206 executes the program code 212 in the memory 210 through the CPU 208, thereby controlling the operation of the communication device 200. The communication device 200 can receive signals input by a user through the input device 202, such as a keyboard or keypad, and can output images and sounds through the output device 304, such as a monitor or speakers. The transceiver 214 is used to receive and transmit wireless signals wirelessly, deliver received signals to the control circuit 206, and output signals generated by the control circuit 206.

Figure 3:
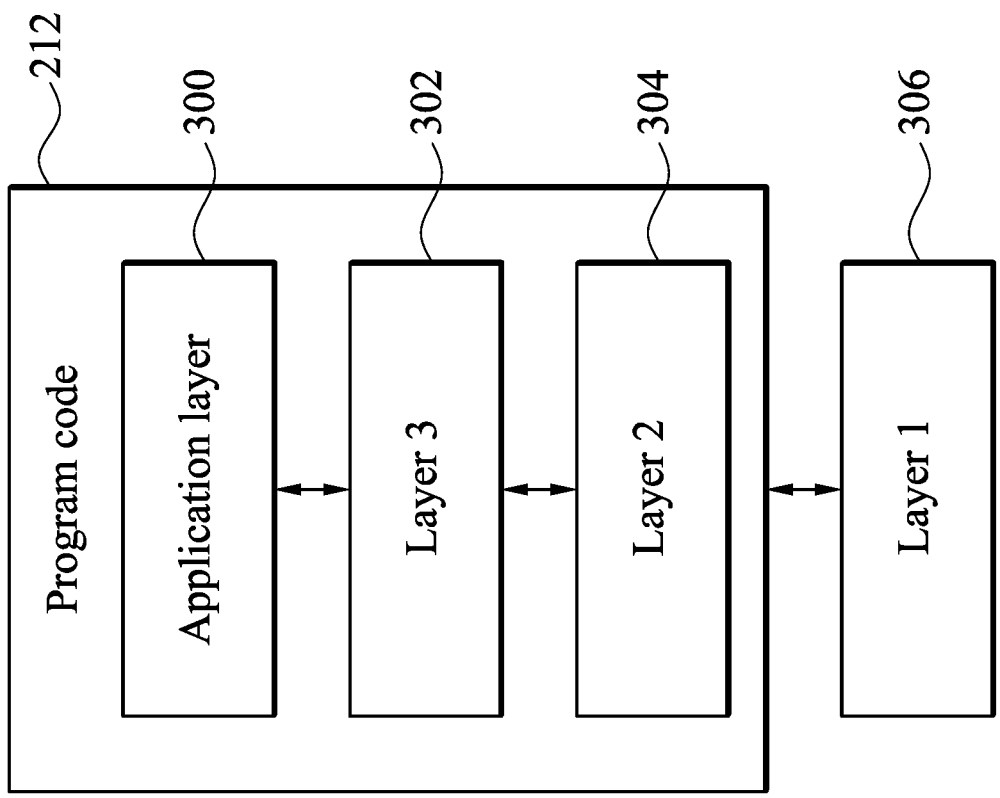
FIG. 3 is a simplified block diagram of the program code shown in FIG. 2 in accordance with one embodiment of the disclosure.

FIG. 3 is a simplified block diagram of the program code 212 shown in FIG. 2 in accordance with one embodiment of the disclosure. In this embodiment, the program code 212 includes an application layer 300, a Layer 3 portion 302, and a Layer 2 portion 304, and is coupled to a Layer 1 portion 306. The Layer 3 portion 302 generally performs radio resource control. The Layer 2 portion 304 generally performs link control. The Layer 1 portion 306 generally performs physical connections.

Since the mobility of the UE and wireless channel condition rapidly changes, a suitable D2D communication mode between the source UE and the destination UE also changes. Therefore, a radio resource scheduling algorithm is provided in the disclosure to dynamically determine the appropriate suitable D2D communication mode and configure the radio resources. On the other hand, how to handle data packets in different nodes, such as the source UE, the relay UE and the destination UE in different D2D communication modes is not mentioned in the LTE standard. Hence, the disclosure introduces at least novel operations for different D2D communication modes. The technique is described in detail as follows.

Figure 4:
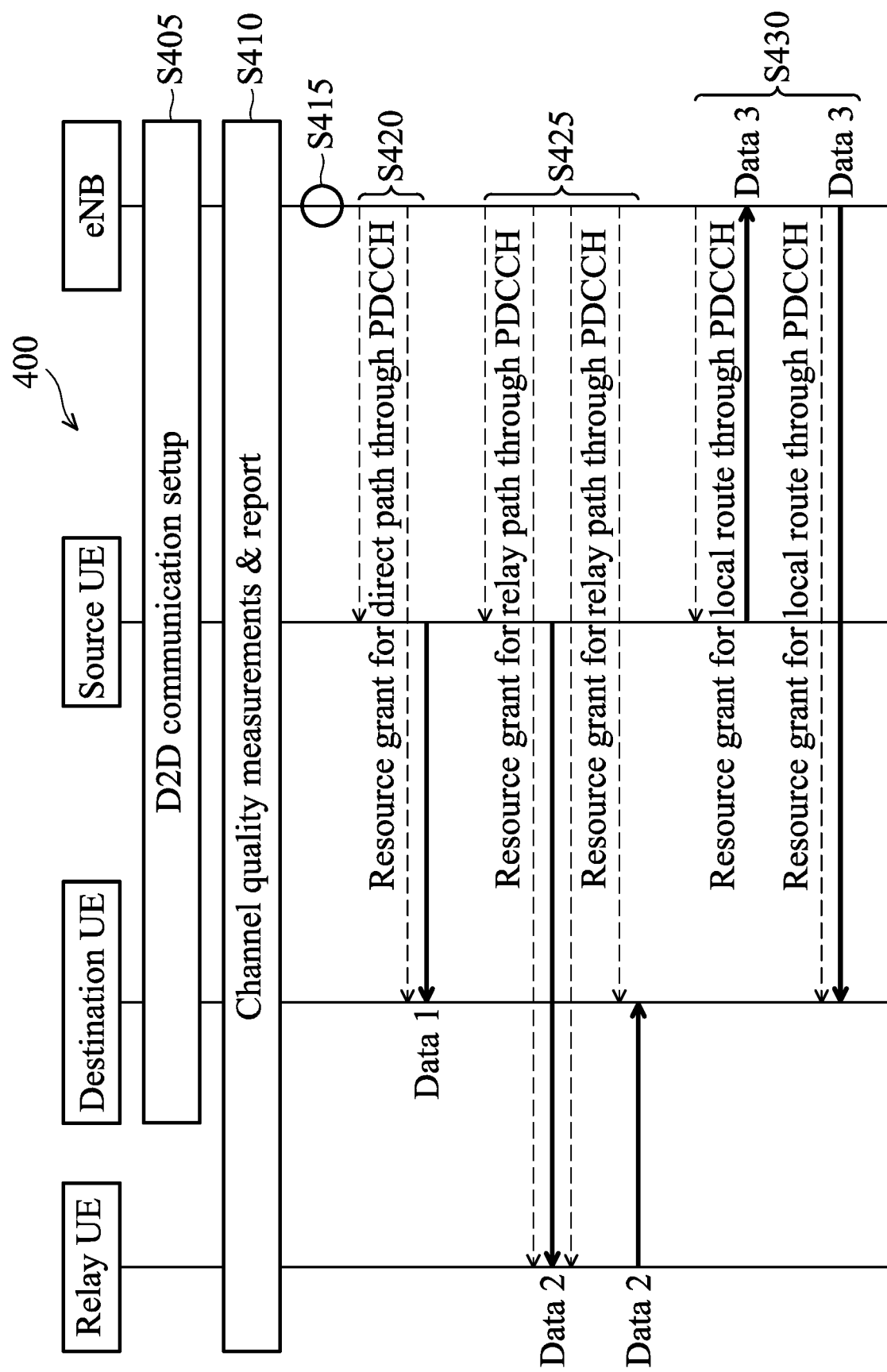
FIG. 4 is a communication flow diagram illustrating that a source UE transmits data packets to a destination UE through different modes of the D2D communication in accordance with one embodiment of the disclosure.

FIG. 4 is a communication flow diagram 400 illustrating that a source UE transmits data packets to a destination UE through different modes of the D2D communication in accordance with one embodiment of the disclosure. As shown in FIG. 4, the eNB can decide to use the D2D communication according to needs of a network strategy or needs of the UE when the eNB knows that the source UE wants to send data packets to the destination UE. In step S405, the eNB can perform a D2D communication setup procedure with the source UE, the destination UE to configure D2D configuration, such as measurement parameters. Then, in step S410, the source UE, the destination UE, and a relay UE can perform channel quality measurements and report the results to the eNB.

According to the results of the channel quality measurements, the eNB can perform a radio resource scheduling algorithm to determine a suitable D2D communication mode between the source UE and the destination UE and configures radio resources in step S415. A detailed description of the radio resource scheduling algorithm will be described below. In step S420, S425, and S430, the eNB can transmit a resource grant through the Physical Downlink Control Channel (PDCCH) to the source UE, the destination UE and the relay UE, respectively at different times to inform the suitable D2D communication mode between the source UE and the destination UE.

For example, at the first time point, the eNB can transmit a resource grant for the direct path mode through the PDCCH to the source UE and the destination UE, respectively, for allocating radio resources to the source UE and the destination UE (dotted lines in step S420), so that source UE can directly transmit first data packets to the destination UE through the direct path (a solid line in step S420). At the second time point, the eNB can transmit a resource grant for the relay path mode through the PDCCH to the source UE, the destination UE and the relay UE, respectively, for allocating radio resources to the source UE, the destination UE and the relay UE (dotted lines in step S425), so that source UE can transmit second data packets to the destination UE by using the relay UE through the relay path (solid lines in step S425). At the third time point, the eNB can transmit a resource grant for the local route mode through the PDCCH to the source UE and the destination UE, respectively, for allocating radio resources to the source UE and the destination UE (dotted lines in step S430), so that source UE can transmit third data packets to the destination UE via the eNB through the local route (solid lines in step S430). It should be noted that the resource grants transmitted to the source UE, the relay UE and the destination UE are different.

Certain embodiments of the present disclosure present techniques for transmitting/reassembling data packets in different D2D communication modes. Also, the detailed description of the radio resource scheduling algorithm will be described below.

Direct Path Mode

Figure 5:
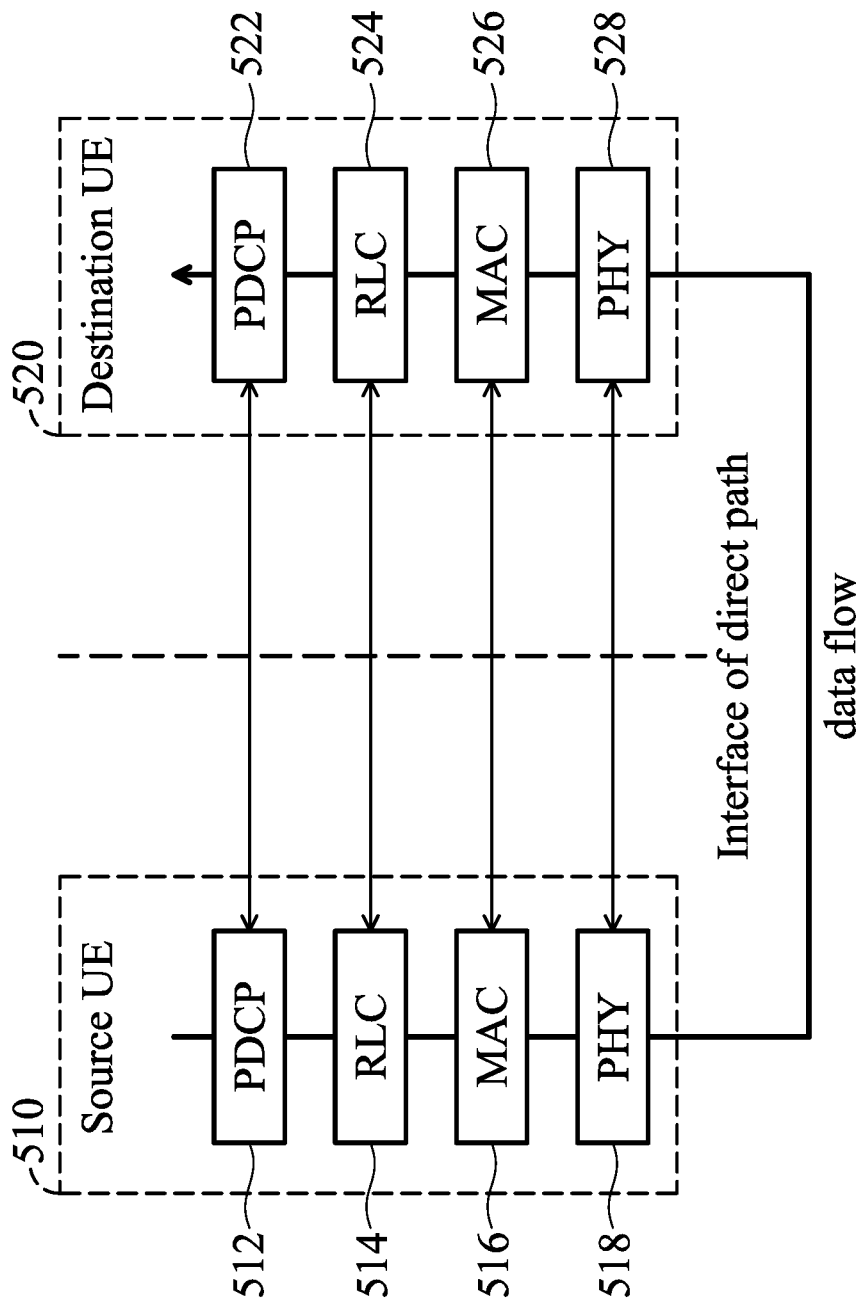
FIG. 5 shows a radio protocol stack of the direct path mode for transmitting data packets between a source UE and a destination UE in accordance with one embodiment of the disclosure.

FIG. 5 shows a radio protocol stack 500 of the direct path mode for transmitting data packets between a source UE 510 and a destination UE 520 in accordance with one embodiment of the disclosure. The protocol stack of the source UE 510 may include a packet data convergence protocol (PDCP) layer 512, a radio link control (RLC) layer 514, a medium access control (MAC) layer 516 and a physical (PHY) layer 518. The protocol stack of the destination UE 520 may include a PDCP layer 522, a RLC layer 524, a MAC layer 526 and a PHY layer 528. Each layer receives a plurality of service data units (SDUs) from a higher layer and adds headers to the SDUs to generate protocol data units (PDU) and transmits the PDUs to a lower layer. The PDUs are treated as SDUs by the lower layer.

A PDCP entity and a RLC entity can be called a radio bearer (RB). Each RB may be configured with a corresponding set of quality of service (QoS) parameters when the RB is established. A UE may have many RBs corresponding to different QoS requirements. The eNB may dynamically determine the radio resource configuration per millisecond (1 ms) according to the results of the channel quality measurements and buffer status reports (BSR) and transmit a resource grant to the source UE 510 through PDCCH to instruct the source UE 510 to transmit data packets to the destination UE 520 in the suitable D2D communication mode. The resource grant may include information where the radio resource is and parameters associated the transmission at the millisecond. In addition, priority handling among RBs in the source UE 510 is handled by a MAC entity of the MAC layer 516 in the source UE 510. The processes of handling data packets in the PDCP layer, the RLC layer and the MAC layer are illustrated as follows.

The PDCP entity at a transmitter side in the PDCP layer 512 performs IP header compression of IP packets to save radio resources used for transmitting the IP packets. The PDCP entity at a receiver side in the PDCP layer 522 performs IP header decompression of the IP packets to retrieve the original IP packets. The PDCP entity also performs ciphering/deciphering for the IP packets to provide encryption of the data to avoid information leak.

Figure 6:
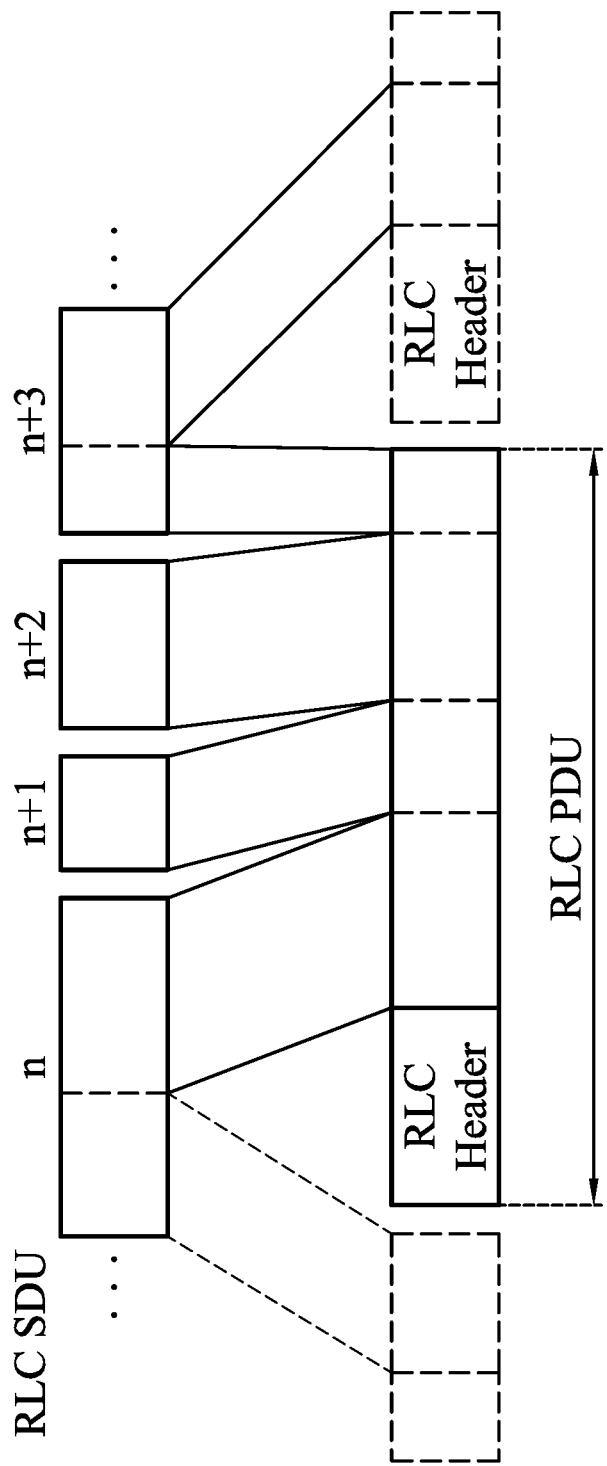
FIG. 6 shows a schematic diagram illustrating the concatenation and segmentation of RLC SDUs in accordance with one embodiment of the disclosure.
Figure 7:
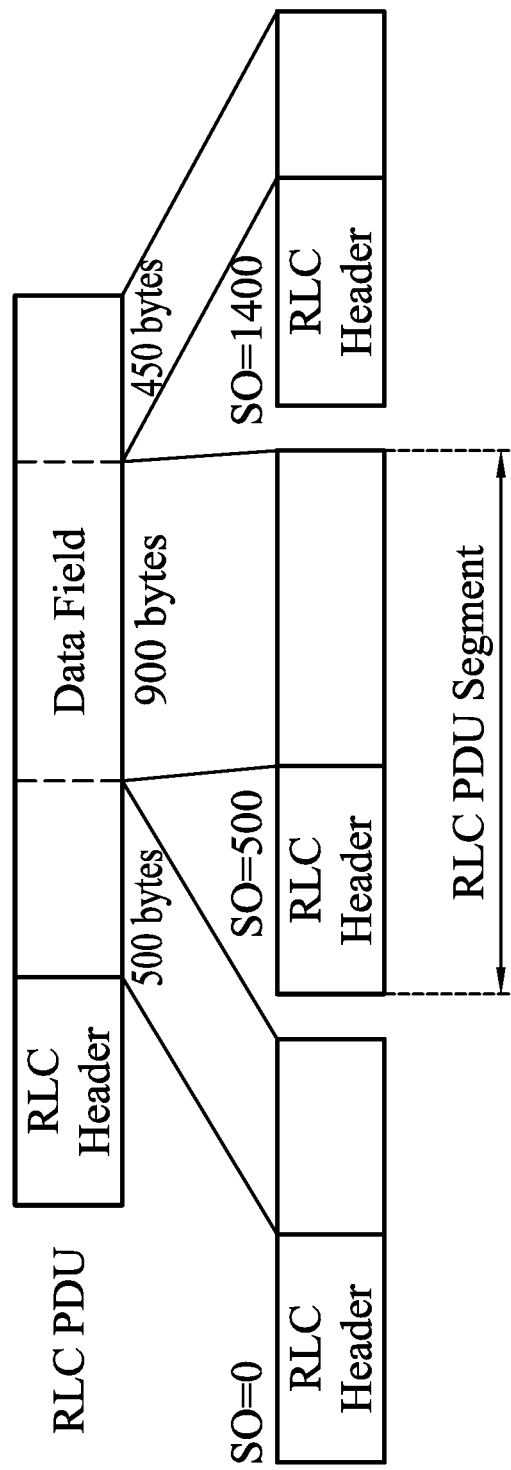
FIG. 7 shows a schematic diagram illustrating the re-segmentation of a RLC PDU in accordance with one embodiment of the disclosure.

The RLC entity at the transmitter side in the RLC layer 514 is responsible for constructing a RLC PDU with a suitable size by segmenting and concatenating one or more sequential RLC SDUs, as shown in FIG. 6. The RLC entity at the receiver side in the RLC layer 524 is responsible for reassembly of the RLC SDUs based on segmentation and concatenation information carried in a RLC header. In addition, a sequence number (SN) is assigned to each RLC PDU and carried in each RLC header. The RLC entity at the receiver side in the RLC layer 524 can perform reordering and duplicate detection of the RLC PDUs based on the SNs. Furthermore, the RLC entity at the receiver side in the RLC layer 524 can notify the RLC entity at the transmitter side in the RLC layer 514 which RLC PDUs are lost, so that the RLC entity at the transmitter side in the RLC layer 514 can retransmit the lost RLC PDUs. If the size of a retransmitted RLC PDU does not fit into a new size determined by the MAC entity in the MAC layer 516, the RLC entity at the transmitter side in the RLC layer 514 can construct multiple RLC PDU segments with suitable sizes by re-segmenting the data field of the retransmitted RLC PDU, as shown in FIG. 7, wherein the SN carried in the header of each RLC PDU segment is equal to the SN of the original retransmitted RLC PDU, and the header of each RLC PDU segment carries the required re-segmentation information (e.g., Segment Offset, SO) additionally.

The MAC entity at the transmitter side in the MAC layer 516 can report the amount of buffered packets (i.e., BSR) to the eNB. When the source UE 510 receives a resource grant from the eNB, the MAC entity of the source UE 510 can determine how many bits can be carried for each RLC entity based on the associated QoS requirements. The resource grant transmitted from the eNB may indicate the radio resources and transmission parameters granted to the source UE 510, wherein the radio resources and the transmission parameters granted to the source UE 510 are determined by the scheduling algorithm performed by the eNB based on the channel quality measurements obtained in step S410 of FIG. 4 and the BSR.

The MAC entity at the transmitter side in the MAC layer 516 can construct a MAC PDU by multiplexing MAC SDUs (which are equal to the RLC PDUs or the RLC PDU segments) delivered from different RLC entities, wherein the header of each MAC PDU carries the size of each MAC SDU and the corresponding RLC identification (ID) of each MAC SDU. The MAC entity at the receiver side in the MAC layer 526 can demultiplex the MAC PDU to retrieve the MAC SDUs based on information carried in the MAC header.

Relay Path Mode

Figure 8:
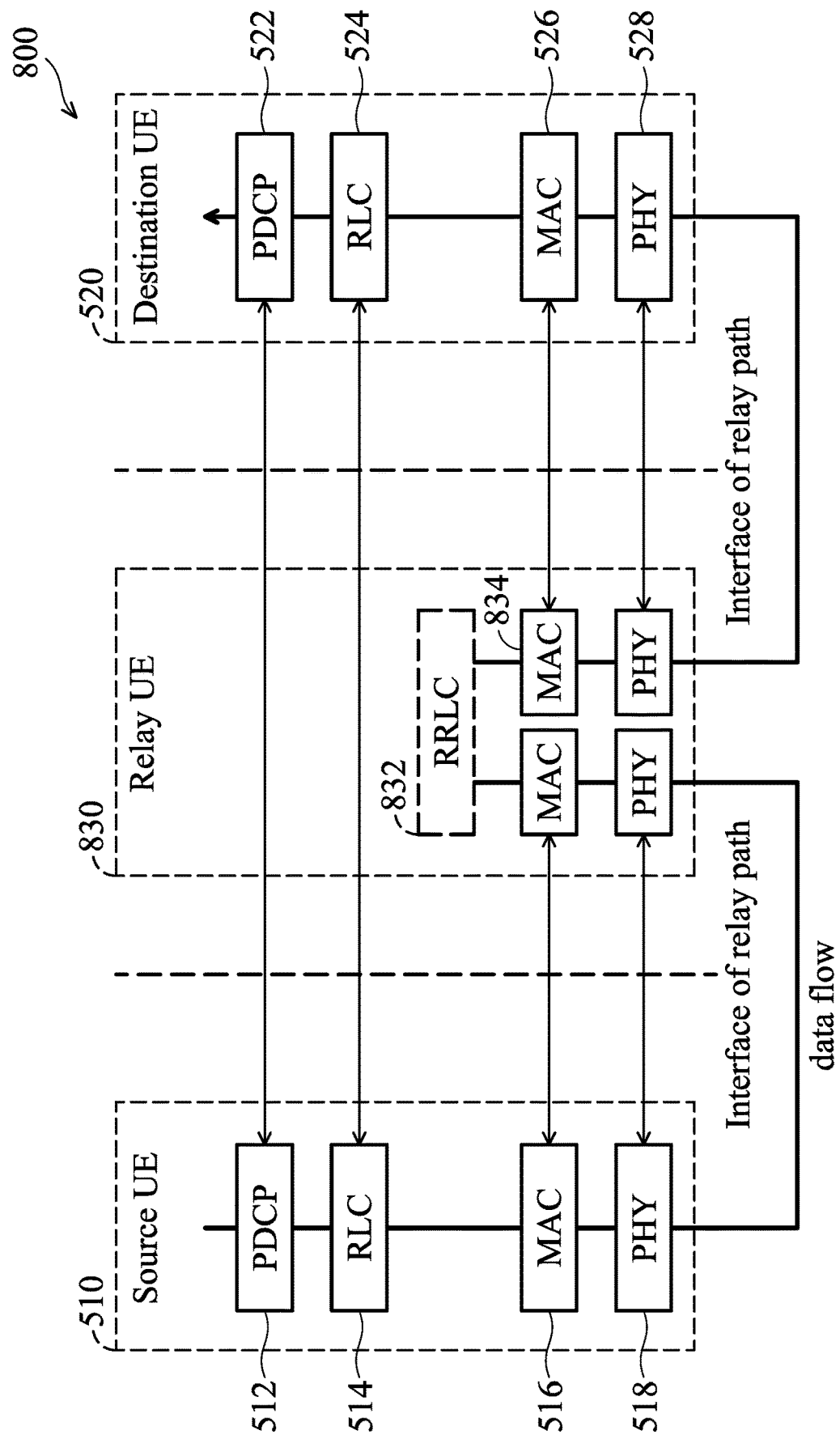
FIG. 8 shows a radio protocol stack of the relay path mode for transmitting data packets between a source UE and a destination UE by using a relay UE in accordance with one embodiment of the disclosure.

FIG. 8 shows a radio protocol stack 800 of the relay path mode for transmitting data packets between a source UE 510 and a destination UE 520 by using a relay UE 830 in accordance with one embodiment of the disclosure. The blocks that may be the same as those in FIG. 5 are indicated by the same reference numbers.

It should be noted that, in the embodiment, a relay RLC (RRLC) layer 832 is configured in the relay UE 830, wherein an RRLC entity in the RRLC layer 832 merely provides a re-segmentation function. More specifically, the MAC SDU from the source UE 510 can be considered as the retransmitted RLC PDU. The RRLC entity in the RRLC layer 832 can construct multiple RLC PDU segments with suitable sizes by re-segmenting the retransmitted RLC PDU, as shown in FIG. 7.

In addition, since the MAC entity of the relay UE 830 does not know the corresponding set of QoS parameters, the MAC entity in the MAC layer 834 of the relay UE 830 performs priority handling based on a first-in first-out (FIFO) principle.

The processes of handling data packets in the RRLC layer and the MAC layer in the relay UE 830 are illustrated as follows.

The RRLC entity in the RRLC layer 832 of the relay UE 830 merely provides a re-segmentation function. If a RLC PDU received from the source UE 510 is indicated by priority handling of the MAC entity in the MAC layer 834 that the RLC PDU can be transmitted without re-segmentation, the RRLC entity delivers the RLC PDU to the MAC layer 834 directly. If a RLC PDU received from the source UE 510 is indicated by priority handling of the MAC entity in the MAC layer 834 that the RLC PDU can be transmitted with re-segmentation, the RRLC entity may construct multiple RLC PDU segments with suitable sizes by re-segmenting the RLC PDU, as shown in FIG. 7. The SN carried in the header of each RLC PDU segment is equal to the SN of the original RLC PDU. The header of each RLC PDU segment carries the required re-segmentation information (e.g., Segment Offset, SO) additionally. The RRLC entity delivers the first RLC PDU segment to the MAC entity in the MAC layer 834.

When the relay UE 830 receives a MAC PDU from the source UE 510, the MAC entity in the MAC layer 834 of the relay UE 830 can demultiplex the MAC PDU to retrieve the RLC PDUs based on information carried in the MAC header. Besides, the MAC entity in the MAC layer 834 of the relay UE 830 may record the sizes, the corresponding RLC ID and the received sequence of RLC PDUs received from the source UE 510. When the relay UE 830 receives a resource grant from the eNB, the MAC entity in the MAC layer 834 of the relay UE 830 may calculate the total number of bits which can be carried in the MAC layer 834. The resource grant transmitted from the eNB indicates the granted radio resources and transmission parameters for the relay UE 830, wherein the granted radio resources and the transmission parameters for the relay UE 830 are determined by the scheduling algorithm performed by the eNB based on the channel quality measurements obtained in step S410 of FIG. 4 and the BSR.

The MAC entity in the MAC layer 834 of the relay UE 830 notifies one or more RRLC entities in the RRLC layer 832 which RLC PDUs can be transmitted without re-segmentation and which RLC PDU can be transmitted with re-segmentation based on the first-in first-out (FIFO) principle.

Figure 9:
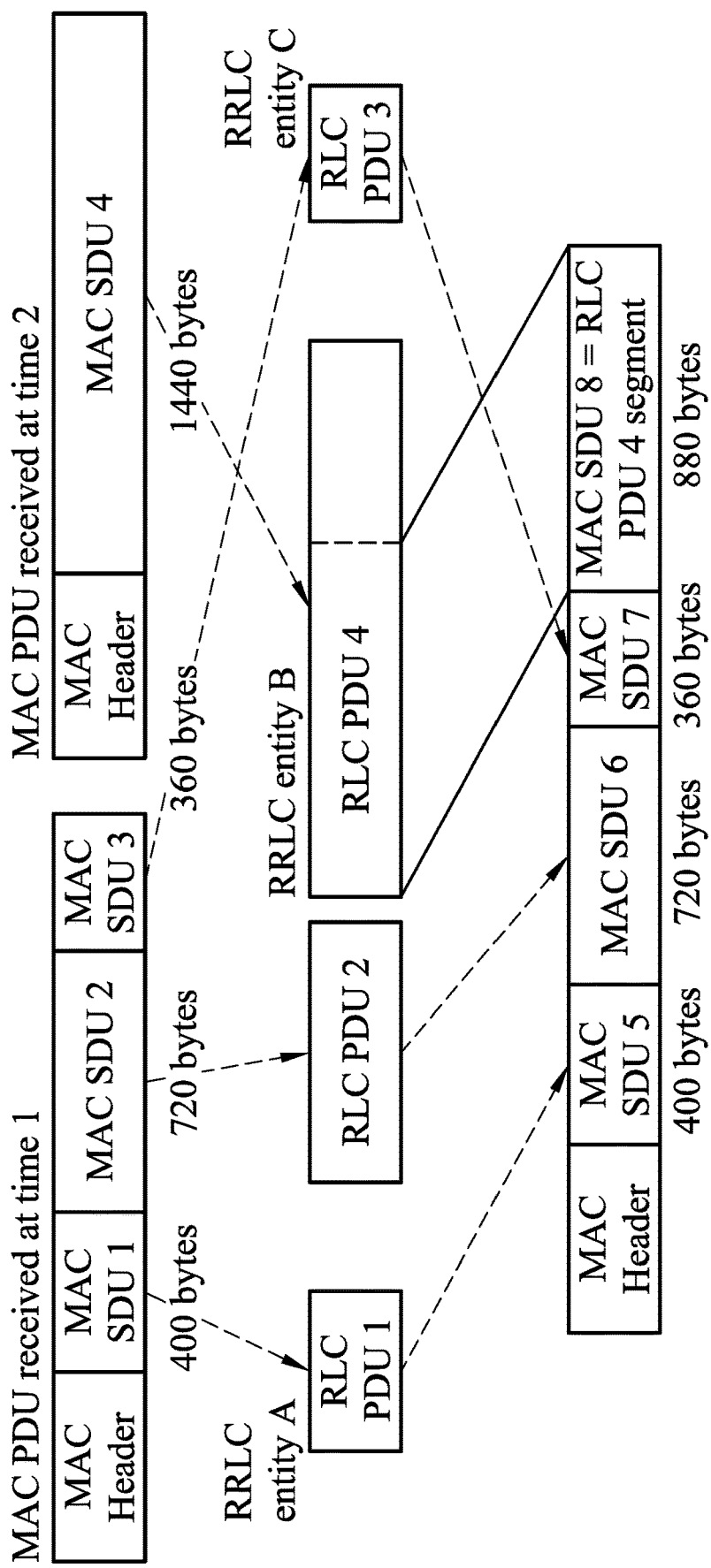
FIG. 9 shows an example of handling data packets by the relay UE in accordance with one embodiment of the disclosure.

FIG. 9 shows an example of handling data packets by the relay UE in accordance with one embodiment of the disclosure. The relay UE in FIG. 9 can be utilized for realizing the relay UE 830 in FIG. 8.

At time 1, the relay UE receives a MAC PDU from the source UE and retrieves RLC PDUs 1~3, wherein the corresponding RLC IDs of the RLC PDUs 1~3 are A~C, respectively. The RLC PDUs 1~3 are delivered to the corresponding RRLC entities A~C, respectively.

At time 2, the relay UE receives another MAC PDU from the source UE and retrieves RLC PDU 4, wherein the corresponding RLC ID of the RLC PDU 4 is B. The RLC PDU 4 is delivered to the corresponding RRLC entity B.

At time 3, the relay UE receives a resource grant from the eNB and the total bytes of the MAC SDUs which can be carried by the granted resources are 2360 bytes. Based on the FIFO principle, the MAC entity in the MAC layer notifies the corresponding RRLC entities in the RRLC layer that the RLC PDUs 1~3 can be transmitted without re-segmentation and the RLC PDU 4 can be transmitted with re-segmentation. Next, the corresponding RRLC entities deliver the RLC PDUs 1~3 to the MAC entity in the MAC layer as the MAC SDUs 5~7, construct a RLC PDU segment with a suitable size by re-segmenting the RLC PDU 4, and deliver the RLC PDU segment to the MAC entity in the MAC layer as the MAC SDU 8. Finally, the MAC entity in the MAC layer constructs a MAC PDU by multiplexing the MAC SDUs 5~8 and delivers the MAC PDU to the PHY entity in the PHY layer in the relay UE.

Figure 10:
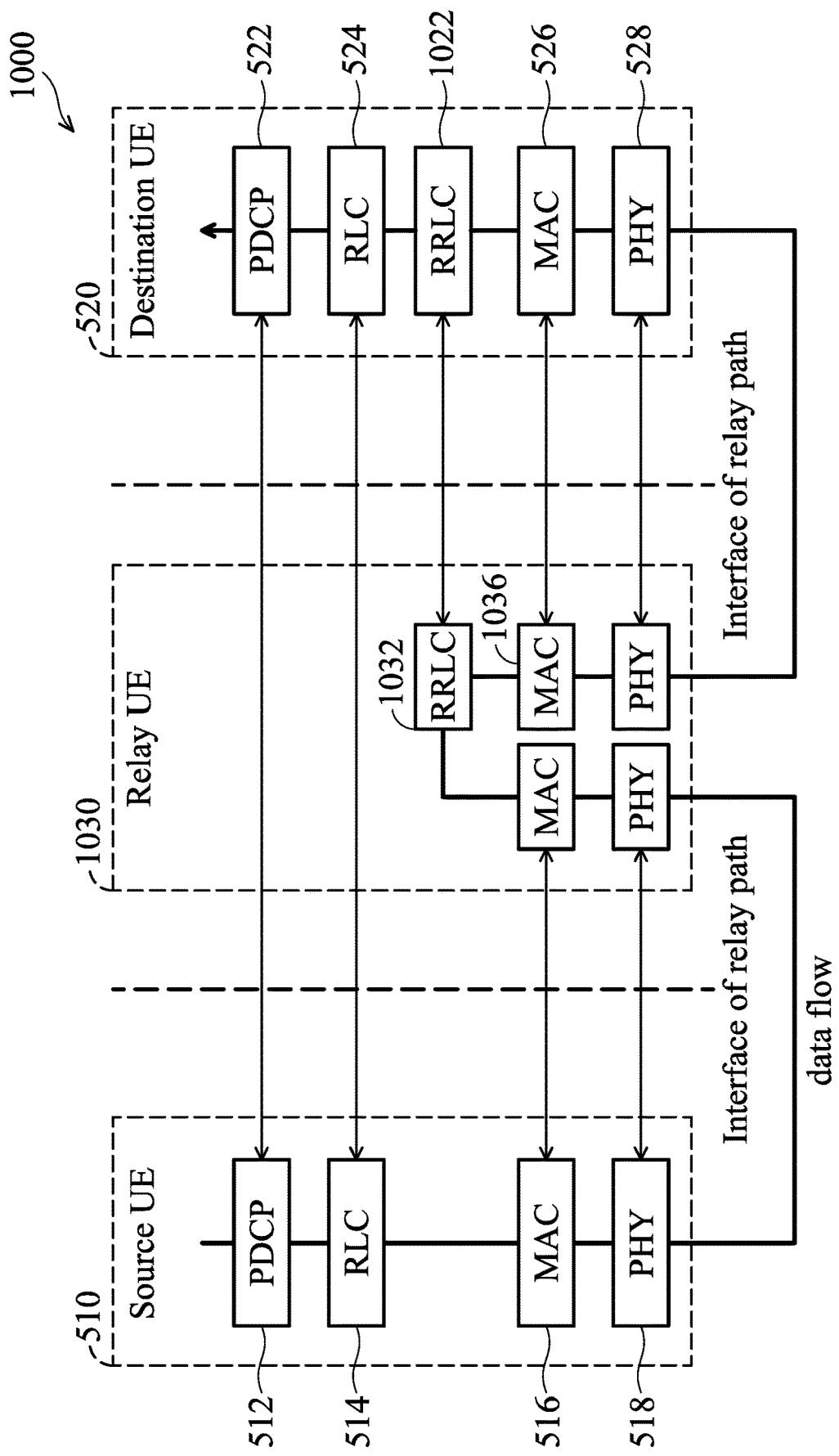
FIG. 10 shows a radio protocol stack of the relay path mode for transmitting data packets between a source UE and a destination UE by using a relay UE in accordance with another embodiment of the disclosure.

FIG. 10 shows a radio protocol stack 1000 of the relay path mode for transmitting data packets between a source UE 510 and a destination UE 520 by using a relay UE 1030 in accordance with another embodiment of the disclosure. The blocks that may be the same as those in FIG. 5 are indicated by the same reference numbers.

It should be noted that, in the embodiment, a relay RLC (RRLC) layer 1032 is configured in the relay UE 1030 and a RRLC layer 1022 is configured in the destination UE 520, wherein a RRLC entity in the RRLC layer 1032 of the relay UE 1030 merely provides concatenation and segmentation functions, a RRLC entity in the RRLC layer 1022 of the destination UE 520 provides reassembly, reordering and duplicate detection functions. The processes of handling data packets in the RRLC layer and the MAC layer in the relay UE 1030 and the destination UE 520 are illustrated as follows.

The RRLC entity in the RRLC layer 1032 of the relay UE 1030 can construct a RRLC PDU with a suitable size by segmenting and concatenating one or more sequential RRLC SDUs. The size of the RRLC PDU is determined by priority handling of the MAC entity in the MAC layer 1036 of the relay UE 1030, wherein the RRLC header carries the required segmentation and concatenation information.

The RRLC entity in the RRLC layer 1022 of the destination UE 520 can reassemble RRLC SDUs based on the segmentation and concatenation information carried in the RRLC header. In addition, the RRLC entity in the RRLC layer 1022 of the destination UE 520 can further perform reordering and duplicate detection of the RRLC PDUs based on the SN.

When the relay UE 1030 receives a MAC PDU from the source UE 510, the MAC entity in the MAC layer 1036 of the relay UE 1030 can demultiplex the MAC PDU to retrieve the RLC PDUs based on information carried in the MAC header. Besides, the MAC entity in the MAC layer 1036 of the relay UE 1030 can record the sizes, the corresponding RLC ID and the received sequence of the RLC PDUs received from the source UE 510. When the relay UE 1030 receives a resource grant from the eNB, the MAC entity in the MAC layer 1036 of the relay UE 1030 can determine how many bits can be carried for each RRLC entity in the RRLC layer 1032 based on the FIFO principle. The resource grant indicates the granted radio resources and transmission parameters for the relay UE 1030, wherein the granted radio resources and transmission parameters for the relay UE 1030 are determined by the scheduling algorithm performed by the eNB based on the channel quality measurements obtained in step S410 of FIG. 4 and the BSR.

Figure 11:
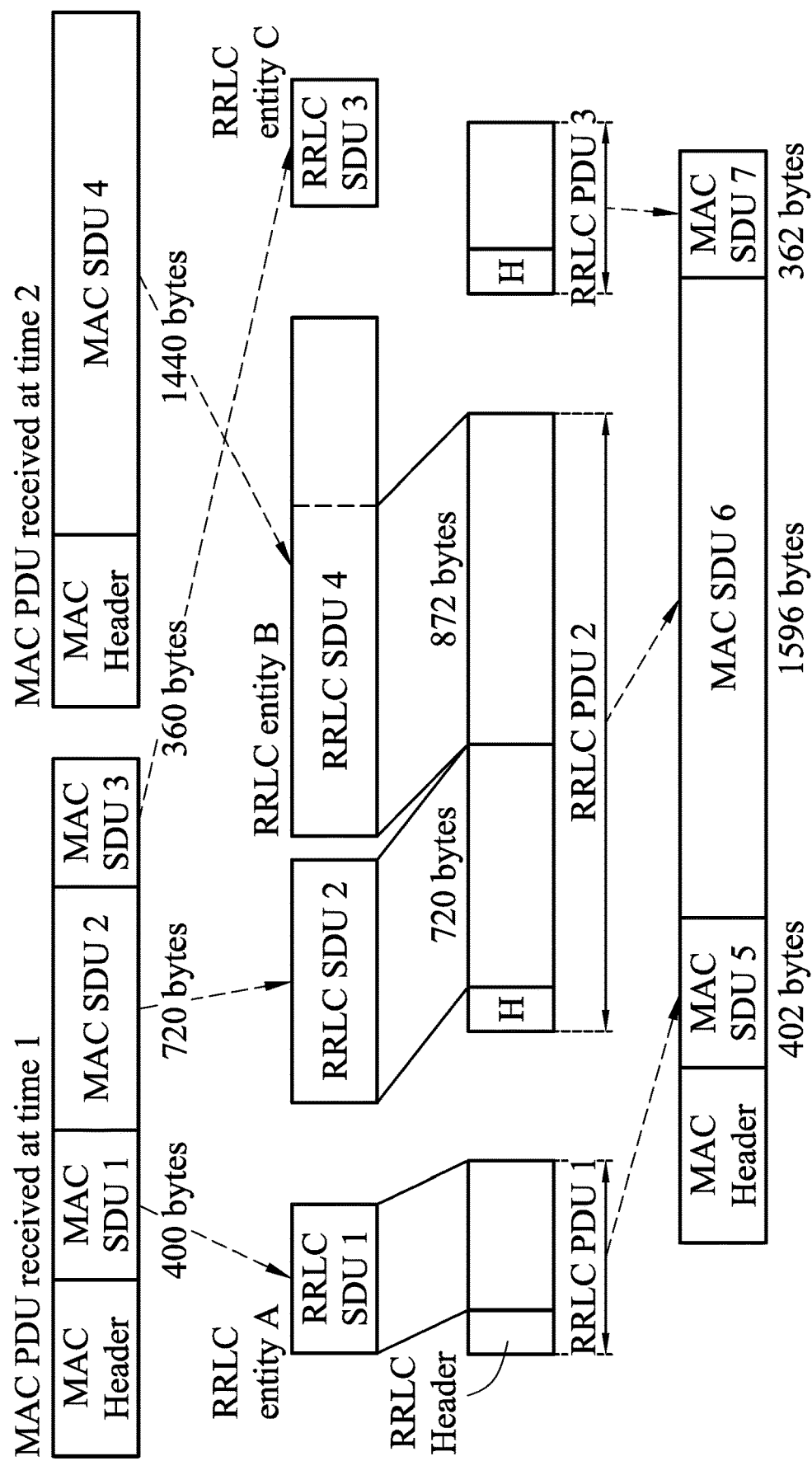
FIG. 11 shows another example of handling data packets by the relay UE in accordance with another embodiment of the disclosure.

FIG. 11 shows another example of handling data packets by the relay UE in accordance with another embodiment of the disclosure. The relay UE in FIG. 11 can be utilized for realizing the relay UE 1030 in FIG. 10.

At time 1, the relay UE receives a MAC PDU from the source UE and retrieves RLC PDUs 1~3, wherein the corresponding RLC IDs of the RLC PDUs 1~3 are A~C, respectively. The RLC PDUs 1~3 are delivered to the corresponding RRLC entities A~C, respectively.

At time 2, the relay UE receives another MAC PDU from the source UE and retrieves RLC PDU 4, wherein the corresponding RLC ID of the RLC PDU 4 is B. The RLC PDU 4 is delivered to the corresponding RRLC entity B.

At time 3, the relay UE receives a resource grant from the eNB and the total bytes of the MAC SDUs which can be carried by the granted resources are 2360 bytes. Based on the FIFO principle, the MAC entity in the MAC layer of the relay UE determines how many bits can be carried for each RRLC entity. The RRLC entity A constructs a RRLC PDU 1 including whole RRLC SDU 1 without concatenating other RRLC PDU(s) or RRLC PDU segment(s). The RRLC entity B constructs a RRLC PDU 2 by segmenting the RRLC SDU 4 and concatenating whole RRLC SDU 2 and the segment of the RRLC SDU 4. The RRLC entity C constructs a RRLC PDU 3 including whole RRLC SDU 3 without concatenating other RRLC PDU(s) or RRLC PDU segment(s). The RRLC entities A~C deliver the RRLC PDUs 1~3 to the MAC entity in the MAC layer of the relay UE as the MAC SDUs 5~7. Finally, the MAC entity in the MAC layer of the relay UE constructs a MAC PDU by multiplexing the MAC SDUs 5~7 and delivers the MAC PDU to the PHY entity in the PHY layer in the relay UE.

Local Route Mode

Figure 12:
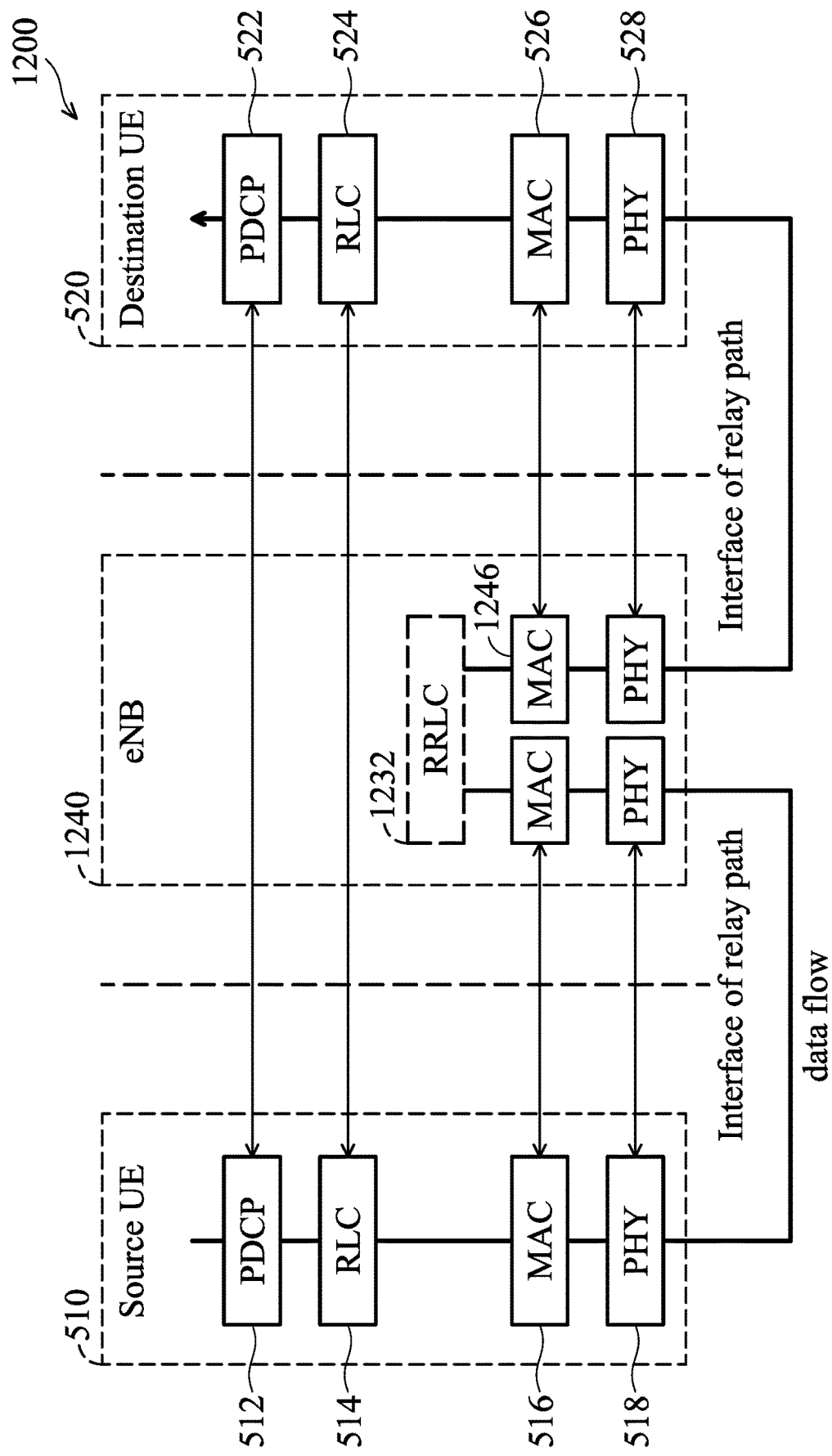
FIG. 12 shows a radio protocol stack of the relay path mode for transmitting data packets between a source UE and a destination UE via the eNB in accordance with one embodiment of the disclosure.
Figure 13:
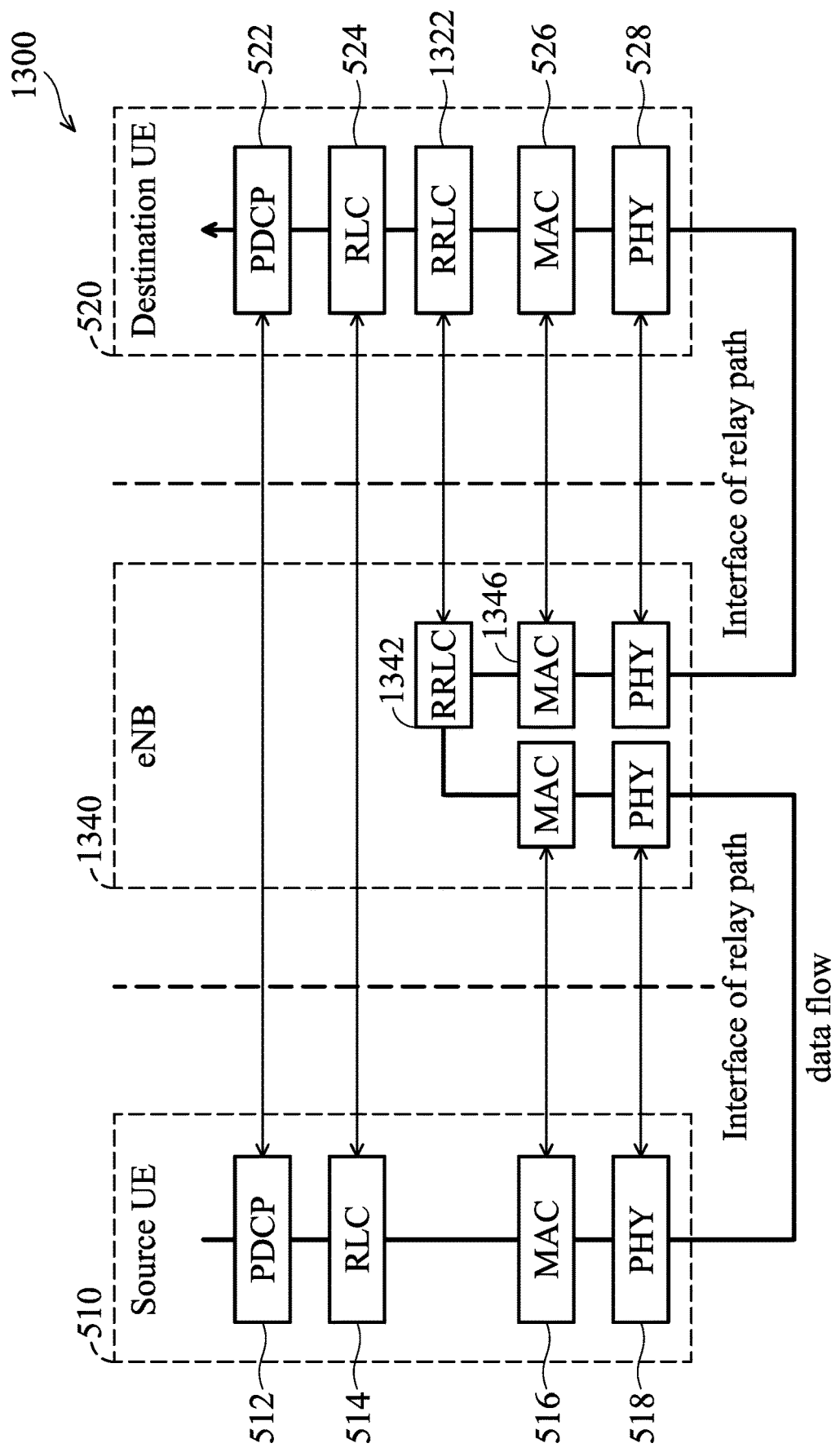
FIG. 13 shows a radio protocol stack of the relay path mode for transmitting data packets between a source UE and a destination UE via the eNB in accordance with another embodiment of the disclosure.

FIGS. 12~13 show a radio protocol stack 1200 and a radio protocol stack 1300 of the local route mode for transmitting data packets between a source UE 510 and a destination UE 520 via the eNB in accordance with one embodiment of the disclosure. The blocks that may be the same as those in FIG. 8 and FIG. 10 are indicated by the same reference numbers.

As shown in FIGS. 12~13, the architecture of the local route mode is substantially same as the architecture of the relay path mode. The difference between the architecture of the local route mode and the architecture of the relay path mode is that the eNB is used to replace the relay UE. Therefore, a RRLC entity in the RRLC layer 1232 of the eNB 1240, a MAC entity in the MAC layer 1246 of the eNB 1240 and other related technologies in FIG. 12 are the same as the illustration of the embodiment described FIG. 8, so the details related to the technologies of the system will be omitted. Similarly, a RRLC entity in the RRLC layer 1342 of the eNB 1340, a MAC entity in the MAC layer 1346 of the eNB 1340 and other related technologies in FIG. 13 are the same as the illustration of the embodiment described FIG. 10, so the details related to the technologies of the system will be omitted.

However, since the eNB knows the corresponding set of QoS parameters when the RB is established, the MAC entity of the eNB 1240 and the eNB 1340 can perform priority handling based on the corresponding set of QoS parameters. In another embodiment, the MAC entity of the eNB 1240 and the eNB 1340 can also perform priority handling based on the FIFO principle.

Figure 14:
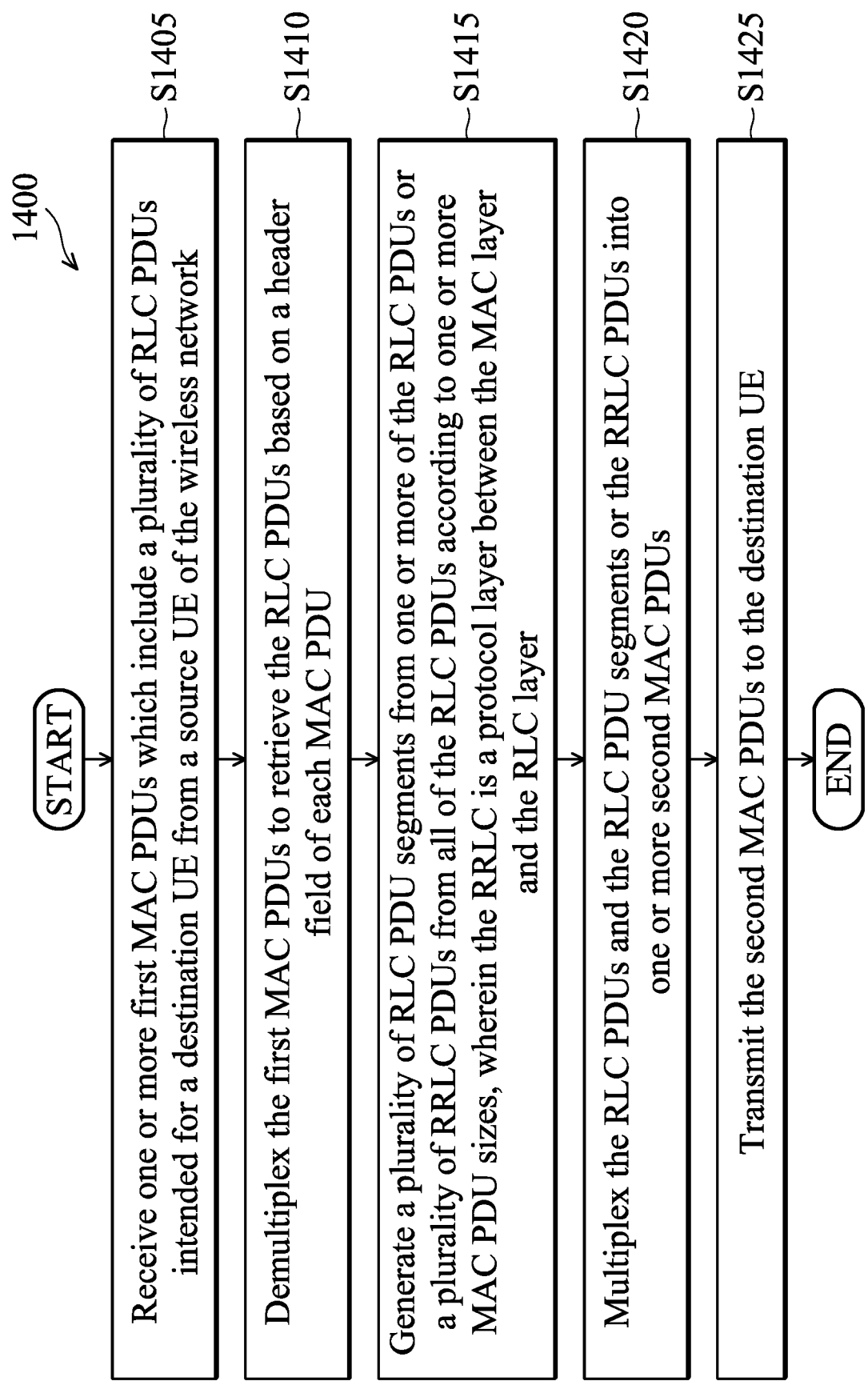
FIG. 14 is a flow diagram illustrating a method for transmitting a plurality of data packets in a wireless network according to an embodiment of the present disclosure.

FIG. 14 is a flow diagram 1400 illustrating a method for transmitting a plurality of data packets in a wireless network according to an embodiment of the present disclosure. The method is used in a communication device such as a relay UE, wherein the communication device can enable device-to-device (D2D) communication. In step S1405, the communication device receives one or more first MAC PDUs which include a plurality of RLC PDUs intended for a destination user equipment (UE) from a source UE of the wireless network. Next, in step S1410, the communication device demultiplexes the first MAC PDUs to retrieve the RLC PDUs based on a header field of each MAC PDU.

In step S1415, the communication device generates a plurality of RLC PDU segments from one or more of the RLC PDUs or a plurality of RRLC (Relay RLC) PDUs from all of the RLC PDUs according to one or more MAC PDU sizes, wherein the RRLC is a protocol layer between the MAC layer and the RLC layer. Then, in step S1420, the communication device multiplexes the RLC PDUs and the RLC PDU segments or the RRLC PDUs into one or more second MAC PDUs. In step S1425, the communication device transmits the second MAC PDUs to the destination UE.

In one embodiment, in step S1415, the communication device can generate one of the RLC PDU segments by re-segmenting a data field of one of the RLC PDUs and adding the required re-segmentation information to a header field of the one of the RLC PDUs according to one of the MAC PDU sizes.

In another embodiment, in step S1415, the communication device can generate the RRLC PDUs by segmenting and concatenating the RLC PDUs and adding a header including the required segmentation and concatenation information to each RRLC PDU according to the MAC PDU sizes.

In one embodiment, the MAC PDU sizes are obtained according to one or more resource grants transmitted from a base station. In another embodiment, the RLC PDUs and the RLC PDU segments or the RRLC PDUs in step S1420 are multiplexed into the second MAC PDUs according to a first-in first-out (FIFO) principle.

In one embodiment, the method shown in FIG. 14 can also be used in a communication device such as a base station. It should be noted that, in step S1420, the base station may multiplex the RLC PDUs and the RLC PDU segments or the RRLC PDUs into the second MAC PDUs according to a priority, wherein the priority is based on a first-in first-out (FIFO) principle or quality of service (QoS) parameters.

Figure 15:
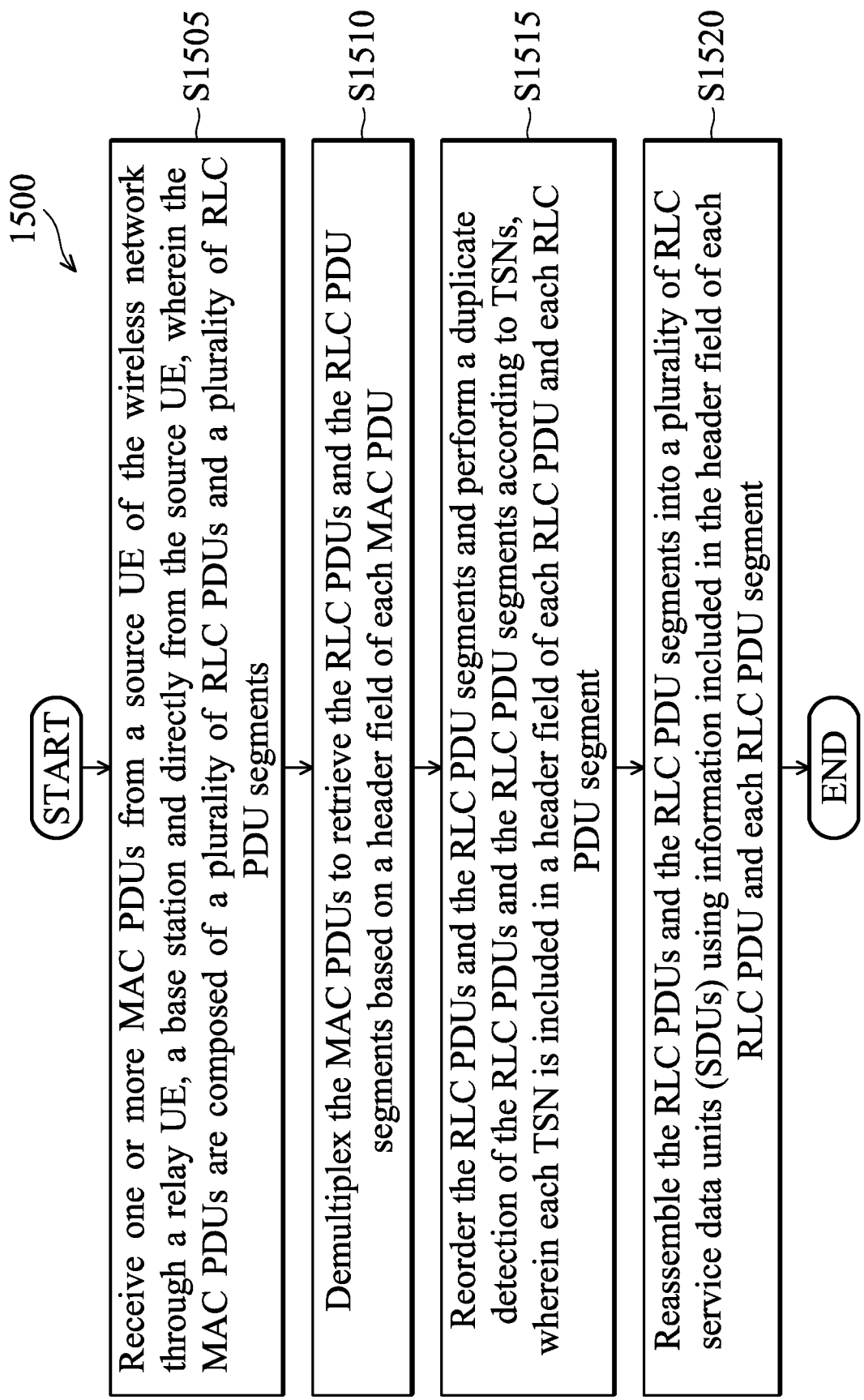
FIG. 15 is a flow diagram illustrating a method for receiving a plurality of data packets in a wireless network according to an embodiment of the present disclosure.

FIG. 15 is a flow diagram 1500 illustrating a method for receiving a plurality of data packets in a wireless network according to an embodiment of the present disclosure. The method is used in a communication device such as a destination UE, wherein the communication device can enable device-to-device (D2D) communication. In step S1505, the communication device receives one or more MAC PDUs from a source UE of the wireless network through a relay UE, a base station and directly from the source UE, wherein the MAC PDUs are composed of a plurality of RLC PDUs and a plurality of RLC PDU segments. Next, in step S1510, the communication device demultiplexes the MAC PDUs to retrieve the RLC PDUs and the RLC PDU segments based on a header field of each MAC PDU. In step S1515, the communication device reorders the RLC PDUs and the RLC PDU segments and performs a duplicate detection of the RLC PDUs and the RLC PDU segments according to transmission sequence numbers (TSNs), wherein each TSN is included in a header field of each RLC PDU and each RLC PDU segment. In step S1520, the communication device reassembles the RLC PDUs and the RLC PDU segments into a plurality of RLC SDUs using the information included in the header field of each RLC PDU and each RLC PDU segment.

Figure 16:
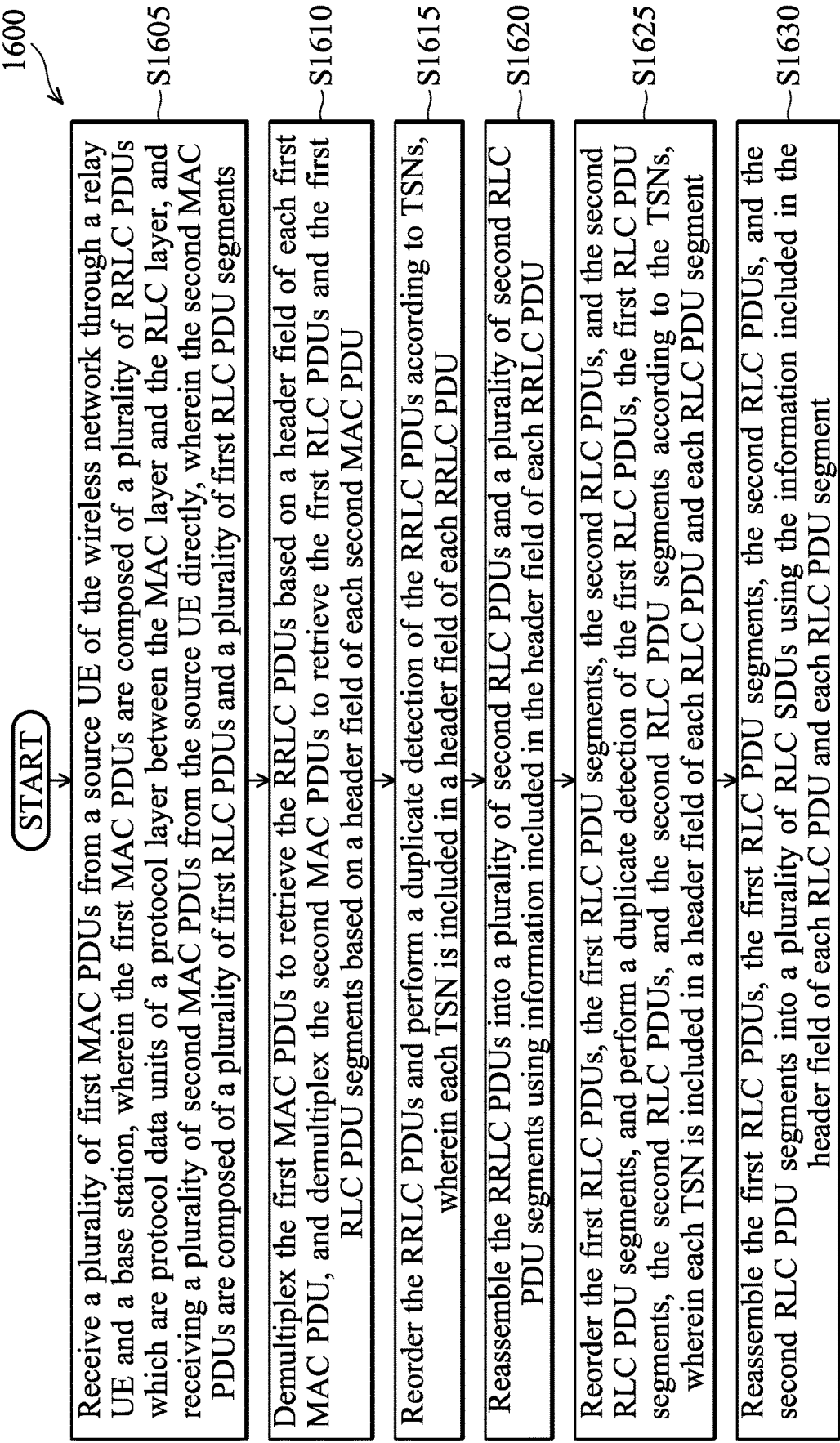
FIG. 16 is a flow diagram illustrating a method for receiving a plurality of data packets in a wireless network according to an embodiment of the present disclosure.

FIG. 16 is a flow diagram 1600 illustrating a method for receiving a plurality of data packets in a wireless network according to an embodiment of the present disclosure. The method is used in a communication device such as a destination UE, wherein the communication device can enable device-to-device (D2D) communication. In step S1605, the communication device receives a plurality of first MAC PDUs from the source UE through a relay UE and a base station, wherein the first MAC PDUs are composed of a plurality of RRLC (Relay RLC) PDUs which are protocol data units of a protocol layer between the MAC layer and the RLC layer, and receives a plurality of second MAC PDUs from a source UE of the wireless network directly, wherein the second MAC PDUs are composed of a plurality of first RLC PDUs and a plurality of first RLC PDU segments. Next, in step S1610, the communication device demultiplexes the first MAC PDUs to retrieve the RRLC PDUs based on a header field of each first MAC PDU, and demultiplexes the second MAC PDUs to retrieve the first RLC PDUs and the first RLC PDU segments based on a header field of each second MAC PDU. In step S1615, the communication device reorders the RRLC PDUs and performs a duplicate detection of the RRLC PDUs according to transmission sequence numbers (TSNs), wherein each TSN is included in a header field of each RRLC PDU. In step S1620, the communication device reassembles the RRLC PDUs into a plurality of second RLC PDUs and a plurality of second RLC PDU segments using the information included in the header field of each RRLC PDU. In step S1625, the communication device reorders the first RLC PDUs, the first RLC PDU segments, the second RLC PDUs, and the second RLC PDU segments, and performs a duplicate detection of the first RLC PDUs, the first RLC PDU segments, the second RLC PDUs, and the second RLC PDU segments according to the TSNs, wherein each TSN is included in a header field of each RLC PDU and each RLC PDU segment. In step S1630, the communication device reassembles the first RLC PDUs, the first RLC PDU segments, the second RLC PDUs, and the second RLC PDU segments into a plurality of RLC SDUs using the information included in the header field of each RLC PDU and each RLC PDU segment.

Radio Resource Scheduling Algorithm

Figure 17:
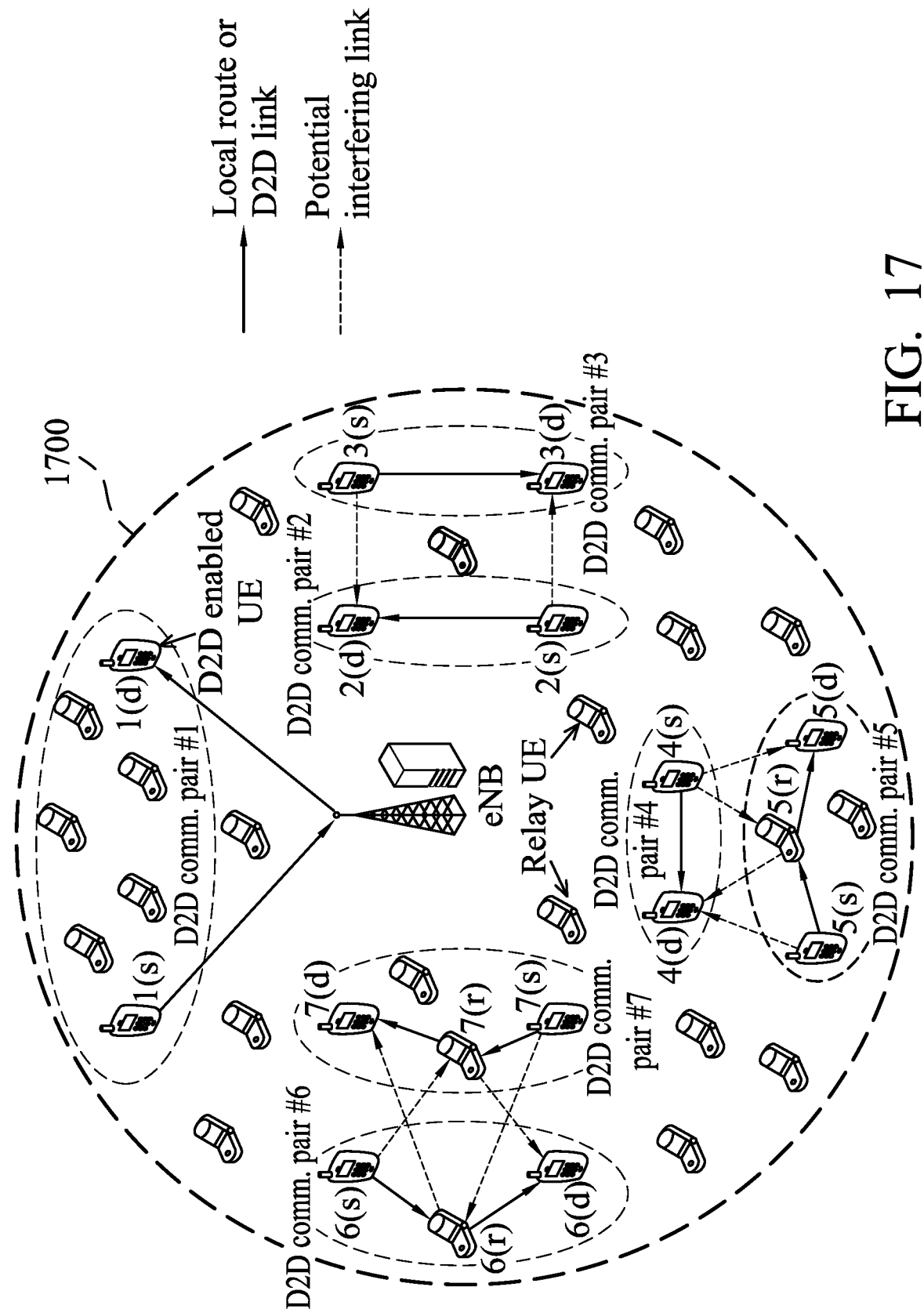
FIG. 17 is a schematic diagram of D2D communication in the LTE-A system with communication modes in accordance with one embodiment of the disclosure.

FIG. 17 is a schematic diagram of D2D communication in the LTE-A system with communication modes in accordance with one embodiment of the disclosure.

As shown in FIG. 17, it is a single cell scenario with D2D and relay communication capable UEs under the LTE-A systems. Two D2D-capable UEs that want to communicate with each other are considered as a D2D-capable communication pairs. For example, seven D2D communication pairs are shown in FIG. 17, i.e., D2D communication pairs #1, #2, #3, #4, #5, #6, and #7. Assume that there are, in total, K D2D communication pairs in the cell 1700, and the D2D communication pair is numbered by k. Accordingly, k, j∈[1, 2, . . . , K]. The source UE and the destination UE of the D2D communication pair #k are denoted by k(s) and k(d), respectively. The total number of relay UEs are N. The relay UEs are used for the candidate relay assisted mode for all the D2D communication pairs. The relay UE selected as the relay for D2D communication pair #k is denoted by k(r). Each D2D communication pair in the cell 1700 has three candidate communication modes, i.e., the direct path mode, the relay path mode, and the local route mode. The radio resources used for assignment are the LTE-A uplink radio resources, and the amount of radio resources are described by the number of physical resource blocks (PRBs). Assume that the total number of PRBs that can be scheduled by the eNB is M.

To ensure the uplink channel condition for the local route mode and improve the spectrum efficiency, the following radio resource assignment rules can be specified. First, a PRB can be assigned to only one D2D communication pair in the local route mode, which means that if a PRB is assigned to a D2D communication pair in the local route mode, the eNB cannot assign the PRB to other D2D communication pair in the local route mode or the direct path/relay path mode. Second, a PRB can be assigned to one or two D2D communication pairs, either in the direct path mode or in the relay path mode, when the total transmission rate on the PRB can be improved. Third, if a D2D communication pair works in the relay path mode, the source-to-relay link and the relay-to-destination link of the D2D communication pair are assigned the same radio resources, i.e., the same PRBs. Finally, it considers that the uplink radio resource scheduling in the LTE-A system is commonly performed based on the Single-Carrier Frequency-Division Multiple Access (SC-FDMA) technology, the PRBs allocated to a D2D communication pair should be contiguous. Under these rules, the potential interferences that should be considered as the interferences between different D2D communication pairs in direct path/relay path mode when the interferences are assigned the same PRBs. The potential interfering links are also shown in FIG. 17.

In addition, there are also two transmission power constraints in the radio resource scheduling process. The first one is that the total transmission power of the source UE in a D2D communication pair on all the PRBs which are assigned to the source UE should not be larger than the allowed maximal transmission power. The second one is that the total transmission power of the source UE in a D2D communication pair should be equally distributed on all the PRBs which are assigned to the source UE.

Figure 18:
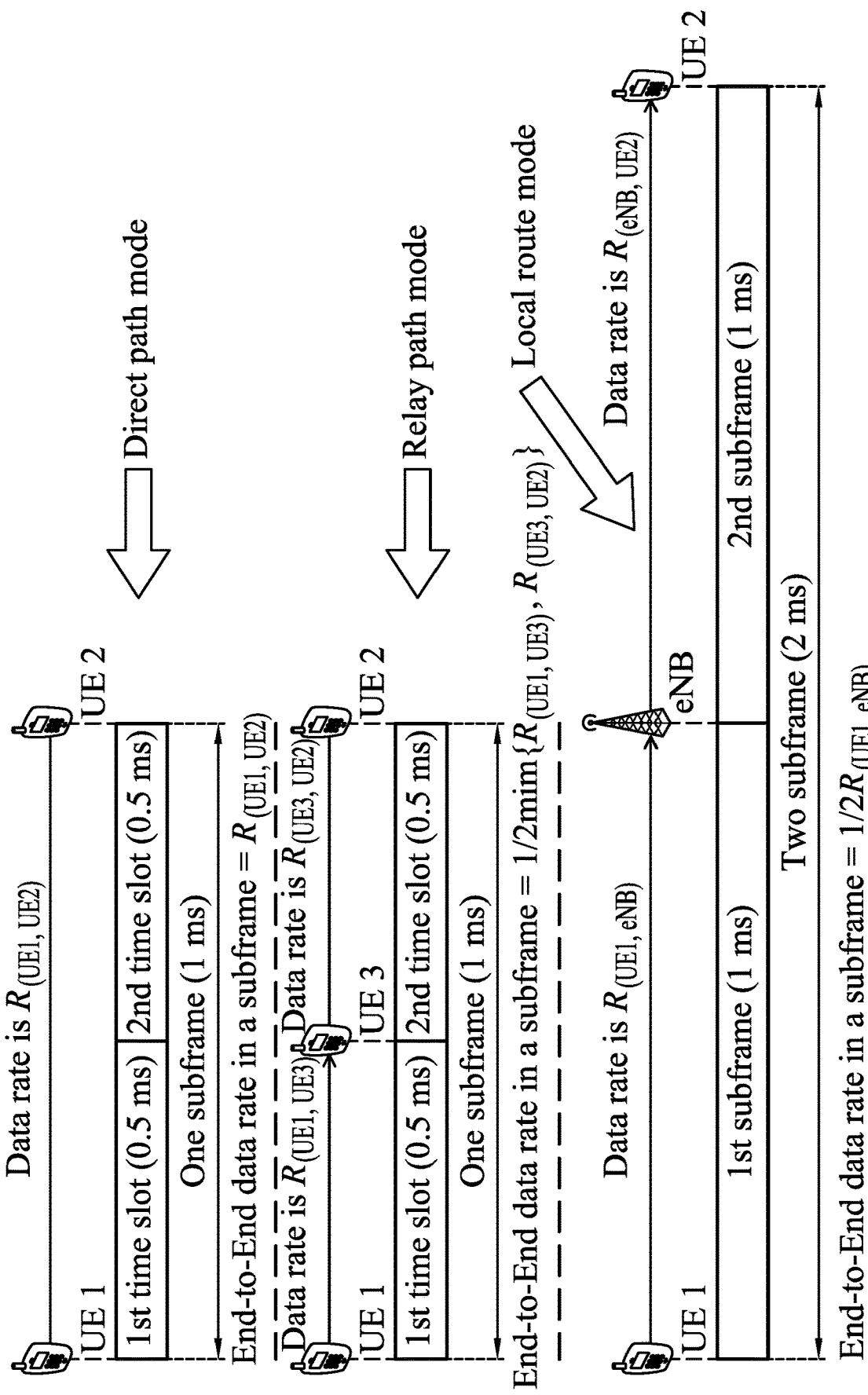
FIG. 18 shows the principle for the transmission data rate estimation under the three D2D communication modes during each subframe.

The radio resource scheduling algorithm is operated in the eNB. For example, the eNB can be considered as a central scheduler, which is in charge of the mode selection, PRBs assignment, and power coordination for all the D2D communication pairs in the whole cell 1700. The scheduling is performed in each LTE-A subframe (1 ms) with the aim to maximize the total throughput of all D2D communication pairs in the cell 1700. The optimal scheduling decision is made based on the CSI of all the involved links, and these CSI are obtained by the feedbacks from all the involved UEs in each subframe. For the D2D communication pairs in the direct path mode, a complete end-to-end data transmission can be performed in one subframe. For the D2D communication pairs in the relay path mode, a complete end-to-end data transmission is composed of the first-hop transmission and the second-hop transmission, which are corresponding to the source-to-relay transmission and relay-to-destination transmission, respectively. Obviously, the first-hop and the second-hop transmissions cannot be carried out simultaneously, which means that the first-hop and the second-hop transmissions must be performed in two time slots. Thus, for the D2D communication pairs in the relay path D2D communication mode, it can be considered that the source-to-relay transmission is performed in the first half of a subframe, while the relay-to-destination transmission is performed in the second half of the subframe. For the D2D communication pairs in the local route mode, the end-to-end data transmission is performed as same as the general cellular communications in which the uplink transmission and the downlink transmission, for example, the source-to-eNB transmission and eNB-to-destination transmission are performed in two separated subframes. FIG. 18 shows the principle for the transmission data rate estimation under the three D2D communication modes during each subframe.

Figure 19:
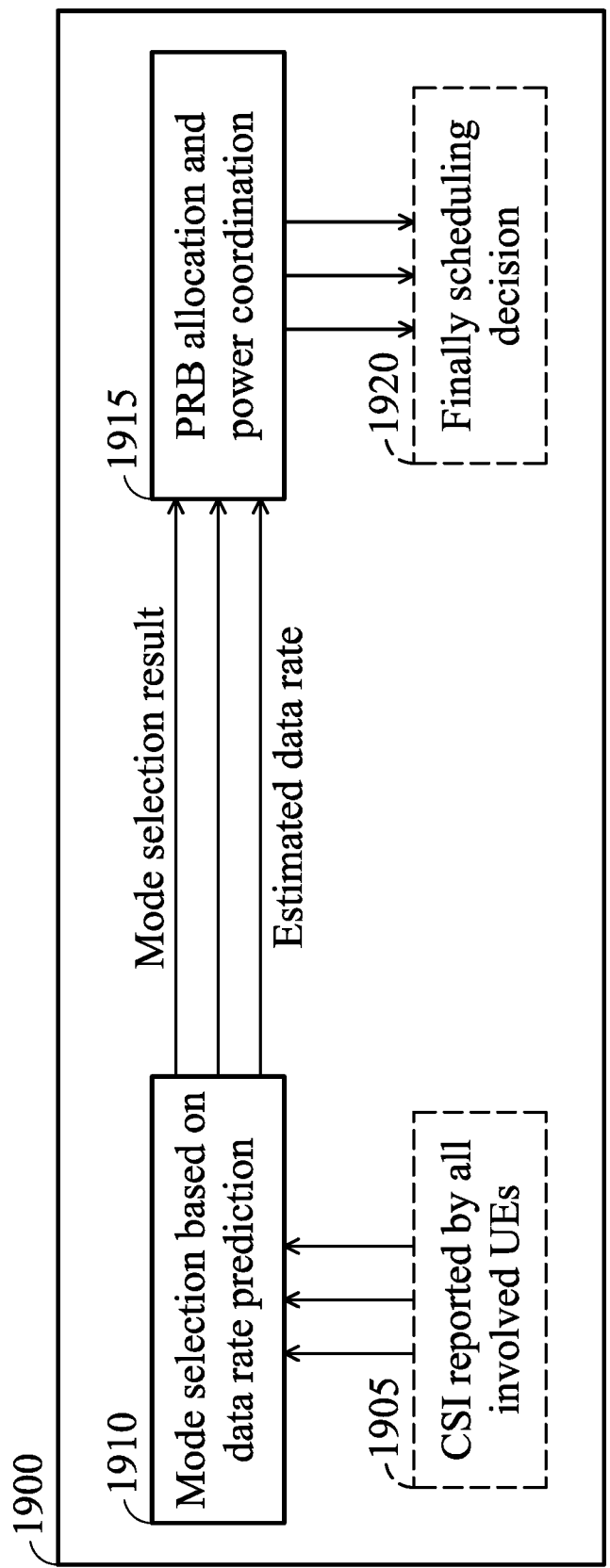
FIG. 19 is a functional block diagram of the scheduling procedure in accordance with one embodiment of the disclosure.

Based on the D2D system mentioned above, the scheduling procedure on the mode selection, the PRB allocation, and the power coordination can be formulated as a mathematical optimization problem with an objective to maximize the total throughput of all the D2D communication pairs in a subframe. The solution for this optimization problem is definitely the optimal scheduling decision. However, it is very complicated to solve the optimization problem for obtaining the absolutely optimal solution in a mathematical way. Thus, a heuristic approach for performing the scheduling procedure on the mode selection and the resource allocations to get a near optimal scheduling decision in each subframe is developed in the disclosure. FIG. 19 is a functional block diagram 1900 of the scheduling procedure in accordance with one embodiment of the disclosure.

In each subframe, the scheduler of the eNB first make mode selection decisions for each D2D communication pair in the cell 1700 according to the predicted data rate for the D2D communication pair under the three communication modes in block 1910. The data rate is predicated based on the reported CSI from all the involved UEs in block 1905 in the subframe. Based on the mode selection result, the PRBs are assigned with an aim to maximize the data transmission rate on every PRB, and the power coordination is performed if the PRBs reuse appears between different D2D communication pairs in block 1910. The details on how to perform the mode selection and the PRB allocation are described as follows.

Mode Selection Based on Data Rate Prediction

The aim for the scheduling is to maximize the total throughput for all the D2D communication pairs in each subframe. Therefore, for each D2D communication pair, the communication mode corresponding to the maximal data rate in that subframe should be selected. For a specific D2D communication pair #k, the mode selection procedure in the scheduling scheme of the disclosure can be described by the following steps.

Step 1: The eNB uses the direct source-to-destination link CSI (channel gain) and the UE's maximal transmission power to estimate the achievable data rate on a PRB. The estimation procedure can be mathematically expressed as $$R_k^{(1)} = B\log_2\left(1 + \frac{P_{max}|h_k^{(1)}|^2}{\sigma^2}\right), \quad (1)$$

wherein $R_k^{(1)}$ denotes the estimated data rate for D2D communication pair #k under the direct path mode, and B denotes the bandwidth of a PRB, i.e., B=180 kHz. $P_{max}$ denotes each UE's maximal transmission power, and $|h_k^{(1)}|^2$ denotes the channel gain of the direct transmission link for D2D communication pair #k, and $\sigma^2$ represents the noise power on a PRB.

Step 2: The eNB estimates the achievable end-to-end data rate for the D2D communication pair #k under the relay path mode on a PRB. To perform this estimation, the eNB first performs the relay selection operation to find the optimal relay UE for D2D communication pair #k, in which the relay UE that can maximize the end-to-end data rate of the relay path is selected as the relay UE k(r). In both relay selection and achievable data rate estimation procedures, the source UE of D2D communication pair #k and all the involved relay UEs use the same transmission power $P_{max}$. The estimation procedure on the achievable end-to-end data rate for D2D communication pair #k on a PRB can be mathematically expressed as $$R_k^{(2)} = \frac{1}{2}B\log_2\left(1 + \min\left\{\frac{P_{max}|h_{k,1}^{(2)}|^2}{\sigma^2}, \frac{P_{max}|h_{k,2}^{(2)}|^2}{\sigma^2}\right\}\right), \quad (2)$$

wherein $R_k^{(2)}$ denotes the estimated achievable end-to-end data rate for the D2D communication pair #k under the relay path mode. $|h_{k,1}^{(2)}|^2$ and $|h_{k,2}^{(2)}|^2$ denote the channel gains for the first-hop and the second-hop links of the relay path mode, respectively. In the "min" function of Equation (2), the first item is the signal-to-noise ratio (SNR) for the source-to-relay link, while the second item is the SNR for the relay-to-destination link. It should be noted that, under the relay path mode, the end-to-end data transmission needs to be completed in two time slots within a subframe and the maximal achievable data rate is determined by the hop relay with the worse channel condition. Therefore, the actual achievable end-to-end data rate is equal to half of data rate that can be achieved on the hop relay with the worse channel condition, which has been shown in FIG. 18.

Step 3: The eNB estimates the achievable end-to-end data rate for the D2D communication pair #k under a local route mode on a PRB. In the local route mode, only the uplink transmission can be completed in a subframe, as shown in FIG. 18. It is assumed that the downlink transmission can always be successful, which means that the downlink data rate is always larger than the uplink data rate, because the eNB is a downlink transmitter and has the capability to ensure the success for the downlink transmission. Therefore, it can be considered that the achievable end-to-end data rate for D2D communication pair #k under the local route mode on a PRB can be determined by its uplink data rate. According to the calculation principle given in FIG. 18, the estimation can be mathematically described as $$R_k^{(3)} = \frac{1}{2} B \log_2\left(1 + \frac{P_{max}|h_k^{(3)}|^2}{\sigma^2}\right), \qquad (3)$$

wherein $R_k^{(3)}$ denotes the estimated achievable end-to-end data rate for D2D communication pair #k under local route mode on a PRB. $|h_k^{(3)}|^2$ denotes the uplink channel gain for D2D communication pair #k on a PRB. The definitions for other parameters are similar to that in Equation (1). Due to the fact that a complete end-to-end transmission in the local route mode needs to be completed in two subframes, it needs to express the achievable end-to-end data rate in a subframe as half of its uplink data rate.

Step 4: After estimation of the achievable end-to-end data transmission rate of the D2D communication pair #k under the three different D2D communication modes, the eNB will make a comparison on the estimated results. The D2D communication mode that is corresponding to the maximal estimated end-to-end data rate is selected as the communication mode for D2D communication pair #k. The examples are shown as follows:

if $R_k^{(1)} = \max\{R_k^{(1)}, R_k^{(2)}, R_k^{(3)}\}$, the direct path mode is selected;

if $R_k^{(2)} = \max\{R_k^{(1)}, R_k^{(2)}, R_k^{(3)}\}$, the relay path mode is selected; or if $R_k^{(3)} = \max\{R_k^{(1)}, R_k^{(2)}, R_k^{(3)}\}$, the local route is selected.

Figure 20:
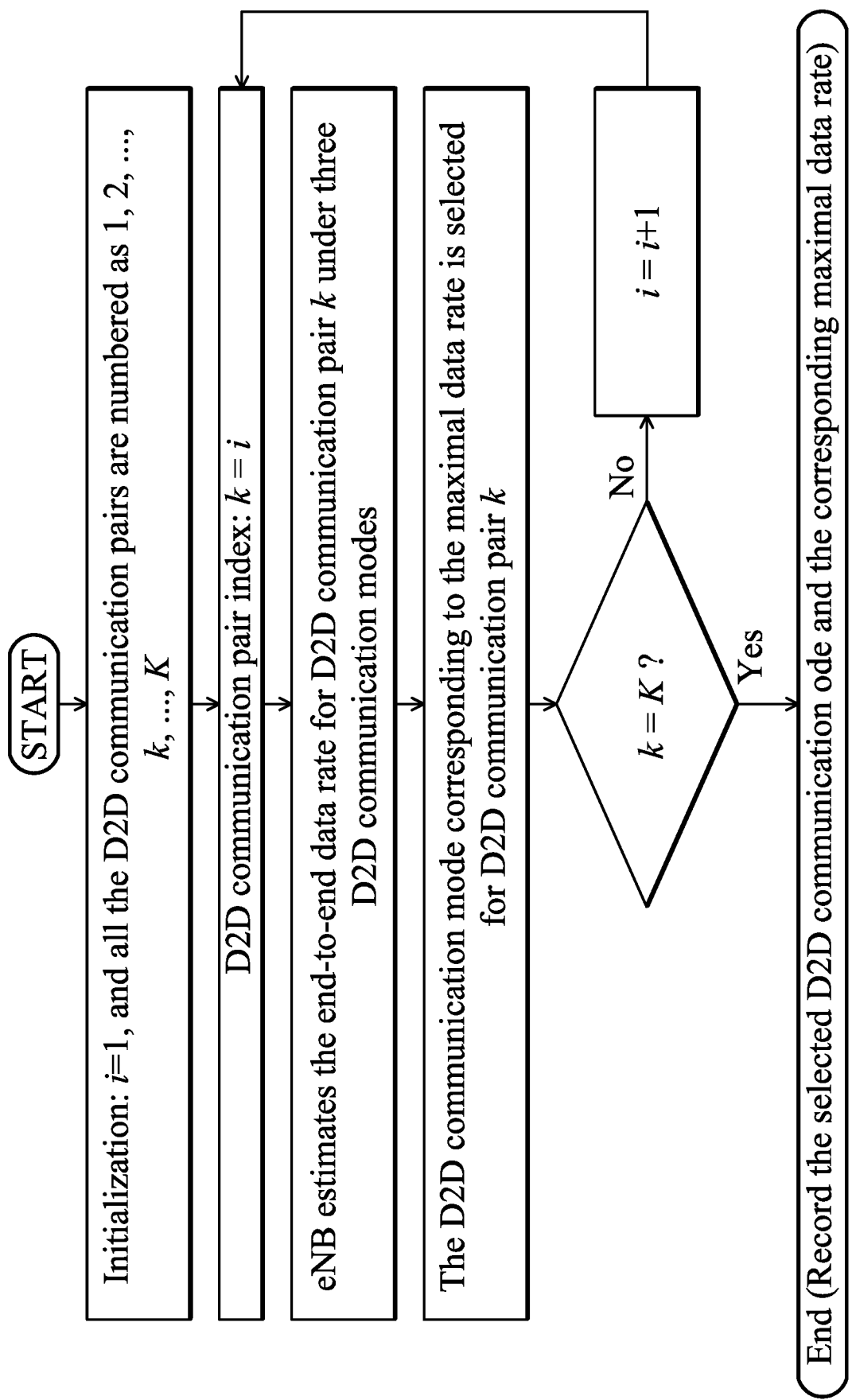
FIG. 20 shows a flow diagram illustrating a mode selection procedure performed by the eNB for all the D2D communication pairs according to an embodiment of the present disclosure.

According to the principle, the eNB can make the mode selection decision for every D2D communication pair, and the maximal end-to-end data transmission rate for each D2D communication pair is also obtained. FIG. 20 shows a flow diagram 2000 illustrating a mode selection procedure performed by the eNB for all the D2D communication pairs according to an embodiment of the present disclosure.

PRB Allocation and Power Coordination

The radio resource (PRBs) allocation is performed based on the maximal end-to-end data rate for all the D2D communication pairs, which have been estimated in the mode selection procedure. The PRB allocation should ensure that the PRBs assigned to a D2D communication pair are contiguous and the transmission power of a source UE in a D2D communication pair should be equally distributed on all the PRBs which are assigned to the D2D communication pair.

The core idea of the proposed PRB allocation strategy is that the D2D communication pairs with the higher end-to-end data rate would have a higher priority in the PRBs assignment and are also corresponding to higher probabilities to be assigned more PRBs. The aim is to maximize the total end-to-end data rate on the M PRBs. It should be noted that the proposed PRB allocation strategy is a two-round allocation strategy. If all the D2D communication pairs are assigned PRBs for the data transmission in the first-round, the radio resource allocation will be terminated. In contrast, if there are still D2D communication pairs in the direct path/relay path mode which are not assigned any PRBs in the first-round allocation, the second-round PRB allocation will be started, wherein the eNB will determine whether these D2D communication pairs share the PRBs that have already been assigned to other D2D communication pair.

I. First-Round PRB Allocation

The first-round PRB allocation is performed based on the single-PRB end-to-end data rate of the K D2D communication pairs, which are working on their optimal D2D communication modes. It is assumed that $R_1, R_2, \ldots, R_k, \ldots, R_K$ denote the data rate of the K D2D communication pairs, respectively. The first-round PRB allocation strategy of the proposed scheduling scheme can be described as follows.

Step 1: The eNB makes rearrangement for the K D2D communication pairs based on the descending order of their data rates. The order for the K D2D communication pairs after the rearrangement can be denoted by $p_1, p_2, \ldots, p_k, \ldots, p_K$, which is corresponding to the relationship $R_{p_1} > R_{p_2} > \ldots > R_{p_k} > \ldots > R_{p_K}$ on their data rate.

Step 2: The eNB assigns the first PRB to the D2D communication pair $p_1$, and computes the end-to-end data rate of the D2D communication pair $p_1$ again by using a reduced transmission power equal to $P_{max}/2$. Then, the eNB makes a comparison to determine whether the D2D communication pair $p_1$ still has the largest end-to-end data rate among all the D2D communication pairs. If so, the process goes to the next step, Step 3. Otherwise, the process goes to Step 4.

Step 3: The eNB assigns the second PRB to the D2D communication pair $p_1$, and computes the end-to-end data rate of the D2D communication pair $p_1$ again by using a reduced transmission power equal to $P_{max}/3$. Then, the eNB makes a further comparison to determine whether the D2D communication pair $p_1$ still has the largest end-to-end data rate among all the D2D communication pairs. If so, the process goes to step 5. Otherwise, the process goes to Step 6.

Step 4: The eNB stops the PRB allocation to the D2D communication pair $p_1$, and assigns the second PRB to the D2D communication pair $p_2$. Then, the eNB computes the end-to-end data rate of the D2D communication pair $p_2$ again by using a reduced transmission power equal to $P_{max}/2$, and makes a further comparison to determine whether the D2D communication pair $p_2$ still has the largest end-to-end data rate among all the D2D communication pairs except the D2D communication pair $p_1$. If so, the process goes to step 7. Otherwise, the process goes to Step 8.

Step 5: The eNB assigns the third PRB to the D2D communication pair $p_1$, and computes the end-to-end data rate of the D2D communication pair $p_1$ again by using a reduced transmission power equal to $P_{max}/4$. The eNB makes a further comparison to determine whether the D2D communication pair $p_1$ still has the largest end-to-end data rate among all the D2D communication pairs. If so, the next PRB (i.e., the fourth PRB) will be assigned to the D2D communication pair $p_1$. Otherwise, the eNB will stop the PRB allocation to the D2D communication pair $p_1$, and assigns the next PRB to the D2D communication pair $p_2$. It should be noted that the assignment procedure goes on until the allocation of all the M PRBs is completed.

Step 6: The eNB stops the PRB allocation to the D2D communication pair $p_1$, and assigns the third PRB to the D2D communication pair $p_2$. Then, the eNB computes the end-to-end data rate of the D2D communication pair $p_2$ again by using a reduced transmission power equal to $P_{max}/2$, and makes a further comparison to determine whether the D2D communication pair $p_2$ still has the largest end-to-end data rate among all the D2D communication pairs except the D2D communication pair $p_1$. If so, the next PRB (i.e., the fourth PRB) will be assigned to the D2D communication pair $p_2$. Otherwise, the eNB will stop the PRB allocation to the D2D communication pair $p_2$, and assigns the next PRB to the D2D communication pair $p_3$. It should be noted that the assignment procedure goes on until the allocation of all the M PRBs is completed.

Step 7: The eNB assigns the third PRB to the D2D communication pair $p_2$ and computes the end-to-end data rate of the D2D communication pair $p_2$ again by using a reduced transmission power equal to $P_{max}/3$. The eNB makes a further comparison to determine whether the D2D communication pair $p_2$ still has the largest end-to-end data rate among all the D2D communication pairs except the D2D communication pair $p_1$. If so, the next PRB (i.e., the fourth PRB) will be assigned to the D2D communication pair $p_2$. Otherwise, the eNB will stop the PRB allocation to the D2D communication pair $p_2$, and assigns the next PRB to the D2D communication pair $p_3$. It should be noted that the assignment procedure goes on until the allocation of all the M PRBs is completed.

Step 8: The eNB stops the PRB allocation to the D2D communication pair $p_2$, and assigns the third PRB to the D2D communication pair $p_3$. Then, the eNB computes the end-to-end data rate for the D2D communication pair $p_3$ again by using a reduced transmission power equal to $P_{max}/2$, and makes a further comparison to determine whether the D2D communication pair $p_3$ still has the largest end-to-end data rate among all the D2D communication pairs except the D2D communication pairs $p_1$ and $p_2$. If so, the next PRB (i.e., the fourth PRB) will be assigned to the D2D communication pair $p_3$. Otherwise, the eNB will stop the PRB allocation to the D2D communication pair $p_3$, and assigns the next PRB to the D2D communication pair $p_4$. It should be noted that the assignment procedure goes on until the allocation of all the M PRBs is completed.

Figure 21:
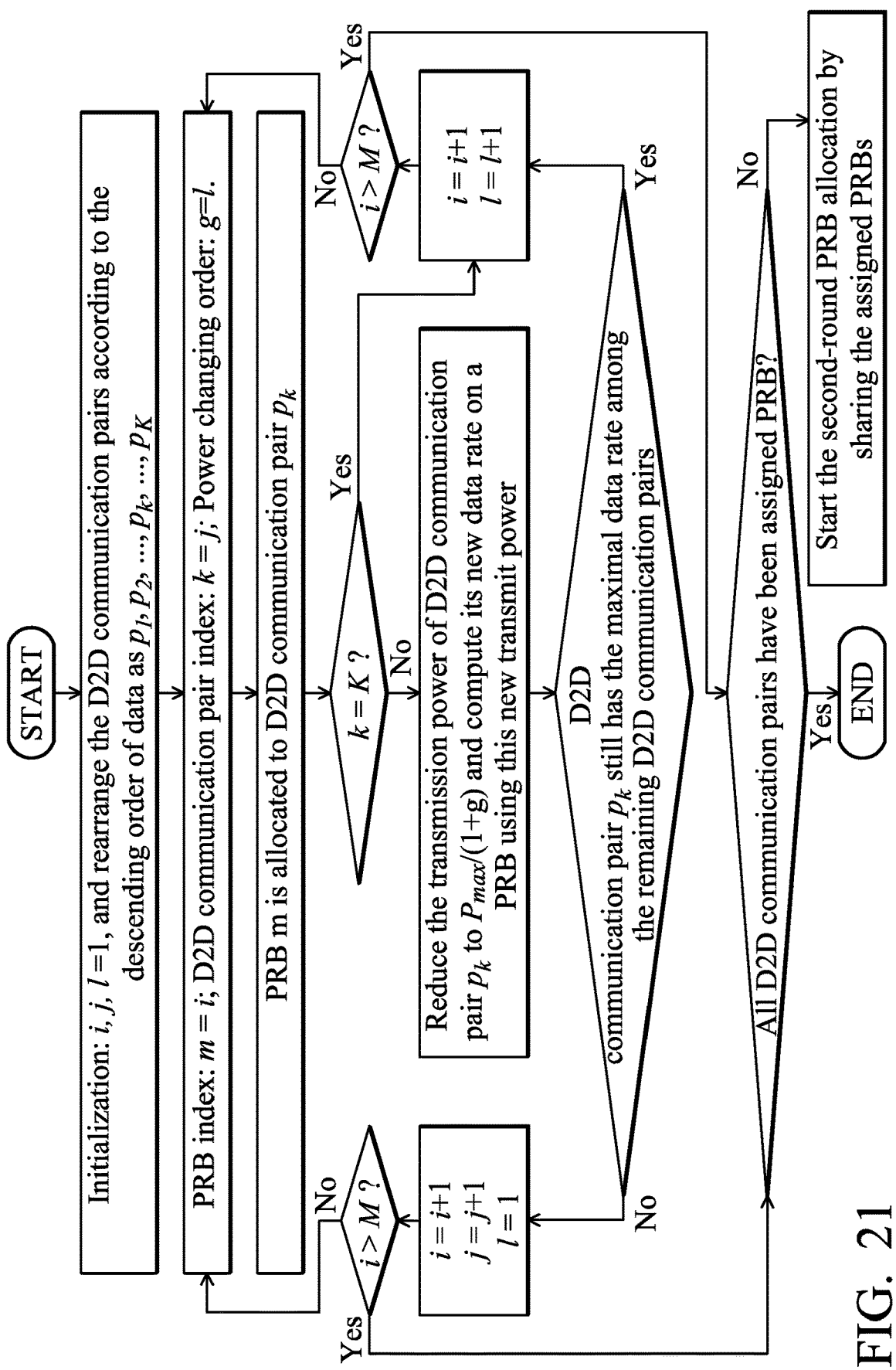
FIG. 21 shows a flow diagram illustrating the first-round PRB allocation in the scheduling algorithm according to an embodiment of the present disclosure.

This kind of PRB assignment procedure goes on until all the M PRBs have been assigned to the D2D communication pairs. For example, the first-round PRB allocation is terminated when all the PRBs have been allocated. If all the PRBs can be assigned to the D2D-capable D2D communication pairs in the first-round PRBs allocation, the eNB will stop the scheduling algorithm. Otherwise, the eNB will determine whether there are still any D2D communication pairs in the direct path/relay path mode that are not assigned any PRBs in the first-round allocation. If so, the eNB will start the second-round PRB allocation. If not, for example, the D2D communication pairs that are not assigned any PRBs in the first-round allocation are under the local route mode, the eNB will also stop the scheduling algorithm. FIG. 21 shows a flow diagram 2100 illustrating the first-round PRB allocation in the scheduling algorithm according to an embodiment of the present disclosure.

II. The Second-Round PRB Allocation

The second-round PRB allocation is performed based on the idea of radio resource sharing, which allows the PRBs that have already been assigned to a D2D communication pair to be reused by another D2D communication pair which has not been assigned any PRBs in the first-round PRB allocation. The aim of the PRBs reuse is to increase the total data amount that can be transmitted in a subframe on these PRBs. The second-round PRB allocation can be performed in the following steps.

Step 1: The eNB lists all the D2D communication pairs that have already been assigned the PRBs during the first-round PRB allocation procedure, and remaining D2D communication pairs that have not been assigned any PRBs yet. All the D2D communication pairs that have been assigned PRB in the first-round allocation, the reuse candidate D2D communication pairs, are indexed as 1, 2, . . . , u, . . . , U, respectively. All the D2D communication pairs that have not been allocated any PRBs in the first-round allocation, the remaining D2D communication pairs, are indexed as 1, 2, . . . , u, . . . , U.

Step 2: The eNB establishes a two-dimensional table to search for optimal reuse partners between the reuse candidate D2D communication pairs and the remaining D2D communication pairs, with the aim to maximize the total data rate on the M PRBs. One dimension of the table is the index of the reuse candidate D2D communication pairs, while the other dimension of the table is the index of the remaining D2D communication pairs. The element of the table contents is the end-to-end data rate increment caused by resource sharing on the reuse candidate D2D communication pair's PRBs, which is also the metric used to select the optimal reuse partners. For each remaining D2D communication pair, the reuse candidate D2D communication pair that is corresponding to the maximal data rate increment will be selected as its reuse partners.

The end-to-end data rate increment is defined as follows. If a D2D communication pair u, which has already been assigned the PRBs during the first-round allocation, can achieve an end-to-end data rate of $R_u$ on its PRBs without the resource reuse, the total end-to-end data rate on these PRBs without the resource reuse is definitely equal to $R_u$. However, in the second-round PRB allocation, if the PRBs of the D2D communication pair u are reused by a remaining D2D communication pair v, which has not been assigned any PRBs in the first-round PRB allocation, the achievable data rate for the D2D communication pair u on its PRBs will change to $R_{v,u}$ due to the interference caused by the PRBs reuse. And the D2D communication pair v can also achieve a data rate of $R_{v,u}$ on the same PRBs. Hence, the total data rate on these PRBs under the reuse condition is the sum of the two D2D communication pairs' data rate, i.e., the total data rate is equal to $R_{u,v}+R_{v,u}$. Therefore, the end-to-end data rate increment caused by the resource reuse on these PRBs is equal to:

$$\alpha_{v,u}=(R_{u,v}+R_{v,u})-R_u$$

In addition, in the second-round PRB allocation, the eNB can set three transmission power levels for each remaining D2D communication pair to perform the power coordination with the aim to ensure the data rate gain on the PRBs reuse. The three transmission power levels may include a high power level, a mid-power level, and a low power level, which are corresponding to the maximal transmission power, the middle strength transmission power, and the minimal transmission power, respectively.

FIG. 22 shows an example illustrating the two-dimensional optimal reuse partner searching process performed by the eNB in the second-round resource allocation according to an embodiment of the present disclosure. It is assumed that there are 5 reuse candidate D2D communication pairs, i.e., U=5, and two remaining D2D communication pairs, i.e., V=2. For each remaining D2D communication pair with each transmission power level, the data rate increments under different candidate partners are obtained, wherein $\alpha_{v,u}^{(h)}$ denotes the data rate increment for the situation that the remaining D2D communication pair v with the maximal transmission power shares the PRBs of the reuse candidate D2D communication pair u. $\alpha_{v,u}^{(m)}$ denotes the data rate increment for the situation that the remaining D2D communication pair v with the middle-level transmission power shares the PRBs of the reuse candidate D2D communication pair u, and $\alpha_{v,u}^{(l)}$ denotes the data rate increment for the situation that the remaining D2D communication pair v with the minimal transmission power shares the PRBs of the reuse candidate D2D communication pair u. For a remaining D2D communication pair, the optimal reuse partner pair and the optimal transmission power level of the remaining D2D communication pair are definitely corresponding to the maximal end-to-end data rate increment. For example, in the searching process shown by FIG. 22, the maximal data rate increment corresponding to the remaining D2D communication pair 1 is $\alpha_{1,2}^{(m)}$, which means that the optimal reuse partner of the remaining D2D communication pair 1 is the reuse candidate D2D communication pair 2, and the optimal transmission power level of the remaining D2D communication pair 1 is the middle-power level. Similarly, the maximal data rate increment for the remaining D2D communication pair 2 is $\alpha_{2,4}^{(k)}$, which means that the optimal reuse partner of the remaining D2D communication pair 2 is the reuse candidate D2D communication pair 4, and the optimal transmission power level of the remaining D2D communication pair 2 is the high-power level.

The entire scheduling process is completed when the second-round PRB allocation procedure is finished, although there might be some D2D communication pairs which are still not be assigned any PRBs during the second-round allocation.

Figure 23:
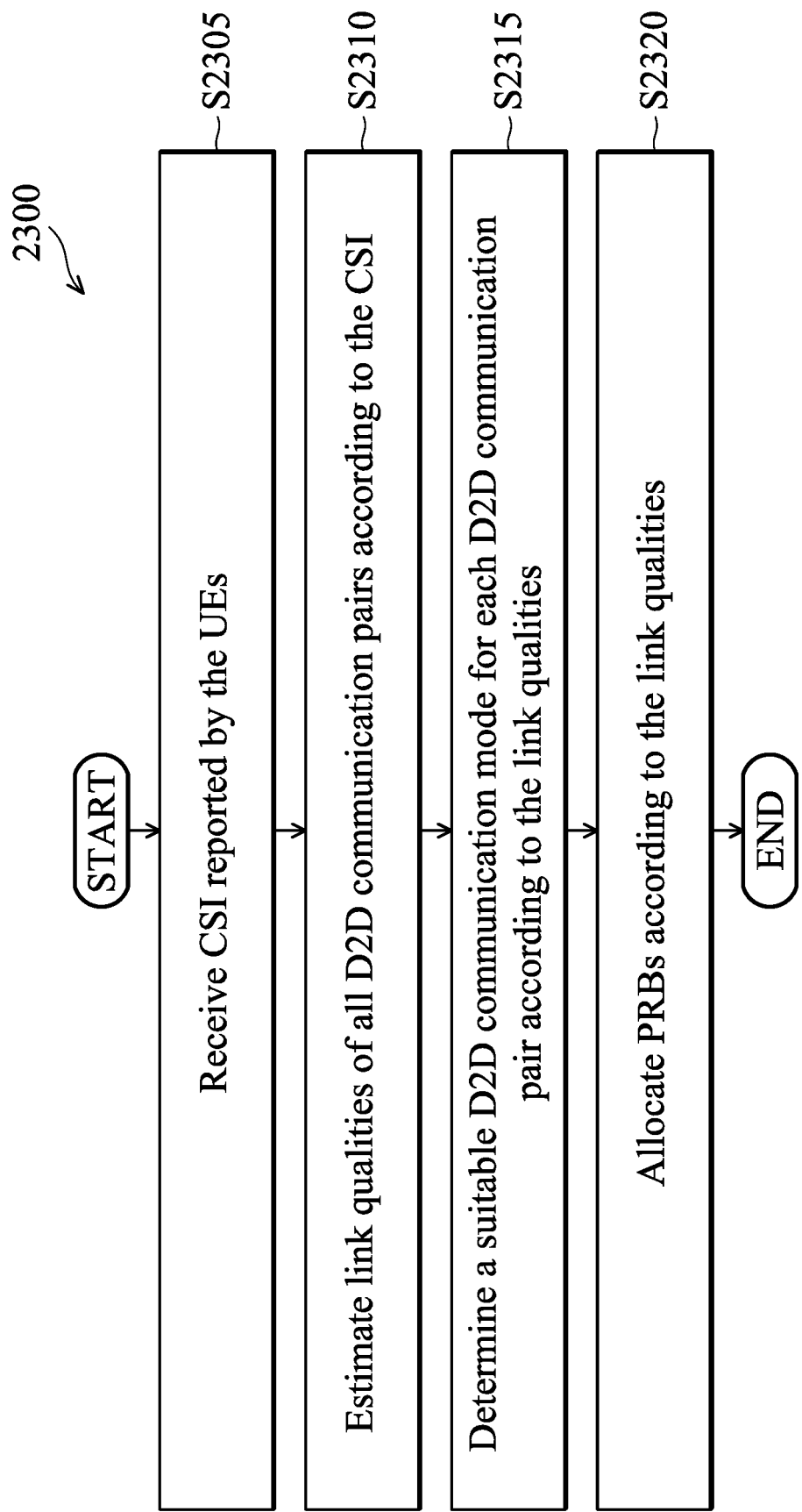
FIG. 23 is a flow diagram illustrating a method for allocating resources for D2D communications of a plurality of UEs according to an embodiment of the present disclosure.

FIG. 23 is a flow diagram 2300 illustrating a method for allocating resources for D2D communications of a plurality of user equipments (UEs) according to an embodiment of the present disclosure. The method is used in a base station. In step S2305, the base station receives channel state information (CSI) reported by the UEs. Then, in step S2310, the base station estimates link qualities of all D2D communication pairs according to the CSI, wherein the link qualities can be end-to-end data rates of all D2D communication pairs. In step S2315, the base station determines a suitable D2D communication mode for each D2D communication pair according to the link qualities, wherein the suitable D2D communication mode is a connection set between a source UE and a destination UE, between the source UE and the destination UE through a relay UE, or between the source UE and the destination UE through the base station. In step S2320, the base station allocates physical resource blocks (PRBs) according to the link qualities.

In one embodiment, the base station can use the first-round allocation shown in FIG. 20 to allocate the PRBs for all the D2D communication pairs according to the link qualities. When the base station determines that there is at least one D2D communication pair which is not allocated any PRBs, the base station can use the second-round allocation shown in FIG. 21 to obtain a data rate increment and share the allocated PRBs with the D2D communication pair according to the data rate increment.

In addition, the CPU 208 could execute the program code 212 to perform all of the above-described actions and steps or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Those with skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art will further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in ways that vary for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or another programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It should be understood that any specific order or hierarchy of steps in any disclosed process is an example of a sample approach. It should be understood that the specific order or hierarchy of steps in the processes may be rearranged while remaining within the scope of the present disclosure. The accompanying method claims present elements of the various steps in a sample order, and are not meant to be limited to the specific order or hierarchy presented.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the disclosure has been described by way of example and in terms of exemplary embodiment, it is to be understood that the disclosure is not limited thereto. Those who are skilled in this technology can still make various alterations and modifications without departing from the scope and spirit of this disclosure. Therefore, the scope of the present disclosure shall be defined and protected by the following claims and their equivalents.

What is claimed is:

1. A communication device for receiving a plurality of data packets in a wireless network, at least comprising:
a control circuit;
a processor installed in the control circuit; a memory installed in the control circuit and coupled to the processor; wherein the processor is configured to execute a program code stored in memory to:
receive one or more medium access control (MAC) protocol data units (PDUs) a) from a source user equipment (UE) of the wireless network through a relay UE and a base station, and b) directly from the source UE, wherein the MAC PDUs are composed of a plurality of radio link control (RLC) PDUs and a plurality of RLC PDU segments;
demultiplex the MAC PDUs to retrieve the RLC PDUs and the RLC PDU segments based on a header field of each MAC PDU;
reorder the RLC PDUs and the RLC PDU segments and perform a duplicate detection of the RLC PDUs and the RLC PDU segments according to transmission sequence numbers (TSNs), wherein each TSN is included in a header field of each RLC PDU and each RLC PDU segment; and
reassemble the RLC PDUs and the RLC PDU segments into a plurality of RLC service data units (SDUs) using information included in the header field of each RLC PDU and each RLC PDU segment.

2. A communication device for receiving a plurality of data packets in a wireless network, at least comprising:
a control circuit;
a processor installed in the control circuit;
a memory installed in the control circuit and coupled to the processor;
wherein the processor is configured to execute a program code stored in memory to:
receive a plurality of first medium access control (MAC) protocol data units (PDUs) from a source user equipment (UE) of the wireless network through a relay UE and a base station, wherein the first MAC PDUs are composed of a plurality of RRLC (Relay RLC) PDUs which are protocol data units of a protocol layer between the MAC layer and the RLC layer, and receiving a plurality of second MAC PDUs from the source UE directly, wherein the second MAC PDUs are composed of a plurality of first RLC PDUs and a plurality of first RLC PDU segments;
demultiplex the first MAC PDUs to retrieve the RRLC PDUs based on a header field of each first MAC PDU, and demultiplex the second MAC PDUs to retrieve the first RLC PDUs and the first RLC PDU segments based on a header field of each second MAC PDU;
reorder the RRLC PDUs and perform a duplicate detection of the RRLC PDUs according to transmission sequence numbers (TSNs), wherein each TSN is included in a header field of each RRLC PDU;
reassemble the RRLC PDUs into a plurality of second RLC PDUs and a plurality of second RLC PDU segments using information included in the header field of each RRLC PDU;
reorder the first RLC PDUs, the first RLC PDU segments, the second RLC PDUs, and the second RLC PDU segments, and perform a duplicate detection of the first RLC PDUs, the first RLC PDU segments, the second RLC PDUs, and the second RLC PDU segments according to the TSNs, wherein each TSN is included in a header field of each RLC PDU and each RLC PDU segment; and
reassemble the first RLC PDUs, the first RLC PDU segments, the second RLC PDUs, and the second RLC PDU segments into a plurality of RLC service data units (SDUs) using the information included in the header field of each RLC PDU and each RLC PDU segment.

3. A method for receiving a plurality of data packets in a wireless network, used in a communication device, comprising:
receiving one or more medium access control (MAC) protocol data units (PDUs) a) from a source user equipment (UE) of the wireless network through a relay UE and a base station, and b) directly from the source UE, wherein the MAC PDUs are composed of a plurality of radio link control (RLC) PDUs and a plurality of RLC PDU segments;
demultiplexing the MAC PDUs to retrieve the RLC PDUs and the RLC PDU segments based on a header field of each MAC PDU;
reordering the RLC PDUs and the RLC PDU segments and performing a duplicate detection of the RLC PDUs and the RLC PDU segments according to transmission sequence numbers (TSNs), wherein each TSN is included in a header field of each RLC PDU and each RLC PDU segment; and
reassembling the RLC PDUs and the RLC PDU segments into a plurality of RLC service data units (SDUs) using information included in the header field of each RLC PDU and each RLC PDU segment.

4. A method for receiving a plurality of data packets in a wireless network, used in a communication device, comprising:
receiving a plurality of first medium access control (MAC) protocol data units (PDUs) from a source user equipment (UE) of the wireless network through a relay UE and a base station, wherein the first MAC PDUs are composed of a plurality of RRLC (Relay RLC) PDUs which are protocol data units of a protocol layer between the MAC layer and the RLC layer, and receiving a plurality of second MAC PDUs from the source UE directly, wherein the second MAC PDUs are composed of a plurality of first RLC PDUs and a plurality of first RLC PDU segments;
demultiplexing the first MAC PDUs to retrieve the RRLC PDUs based on a header field of each first MAC PDU, and demultiplexing the second MAC PDUs to retrieve the first RLC PDUs and the first RLC PDU segments based on a header field of each second MAC PDU;
reordering the RRLC PDUs and performs a duplicate detection of the RRLC PDUs according to transmission sequence numbers (TSNs), wherein each TSN is included in a header field of each RRLC PDU;

reassembling the RRLC PDUs into a plurality of second RLC PDUs and a plurality of second RLC PDU segments using information included in the header field of each RRLC PDU;

reordering the first RLC PDUs, the first RLC PDU segments, the second RLC PDUs, and the second RLC PDU segments, and performing a duplicate detection of the first RLC PDUs, the first RLC PDU segments, the second RLC PDUs, and the second RLC PDU segments according to the TSNs, wherein each TSN is included in a header field of each RLC PDU and each RLC PDU segment; and reassembling the first RLC PDUs, the first RLC PDU segments, the second RLC PDUs, and the second RLC PDU segments into a plurality of RLC service data units (SDUs) using the information included in the header field of each RLC PDU and each RLC PDU segment.

* * * * *